US012639710B2

(12) United States Patent     (10) Patent No.:   US 12,639,710 B2

Rule et al.     (45) Date of Patent:    May 26, 2026

(54) SYSTEMS AND TECHNIQUES TO UTILIZE AN ACTIVE LINK IN A UNIFORM RESOURCE LOCATOR TO PERFORM A MONEY EXCHANGE

(71) Applicant: Capital One Services, LLC, McLean, VA (US)

(72) Inventors: Jeffrey Rule, Chevy Chase, MD (US); George Bergeron, Falls Church, VA (US); Kaitlin Newman, Washington, DC (US); Colin Hart, Arlington, VA (US)

(73) Assignee: Capital One Services, LLC., McLean, VA (US)

( * ) Notice: Subject to any disclaimer, the term of this patent is extended or adjusted under 35 U.S.C. 154(b) by 198 days.

(21) Appl. No.: 17/317,262

(22) Filed: May 11, 2021

(65) Prior Publication Data

US 2022/0366410 A1     Nov. 17, 2022

(51) Int. Cl.
*G06Q 20/40*     (2012.01)
*G06Q 20/32*     (2012.01)

(52) U.S. Cl.
CPC ....... *G06Q 20/401* (2013.01); *G06Q 20/3278* (2013.01); *G06Q 20/4014* (2013.01); *G06Q 2220/00* (2013.01)

(58) Field of Classification Search
CPC ............. G06Q 20/401; G06Q 20/3278; G06Q 20/4014; G06Q 2220/00
USPC .......................................................... 705/44
See application file for complete search history.

(56) References Cited

U.S. PATENT DOCUMENTS

| | | | |
|---|---|---|---|
| 4,683,553 | A | 7/1987 | Mollier |
| 4,827,113 | A | 5/1989 | Rikuna |
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,590,038 | A | 12/1996 | Pitroda |
| 5,592,553 | A | 1/1997 | Guski et al. |
| 5,616,901 | A | 4/1997 | Crandall |
| 5,666,415 | A | 9/1997 | Kaufman |
| 5,763,373 | A | 6/1998 | Robinson et al. |
| 5,764,789 | A | 6/1998 | Pare, Jr. et al. |
| 5,768,373 | A | 6/1998 | Lohstroh et al. |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Hao Fu
*Assistant Examiner* — Merritt J Hasbrouck
(74) *Attorney, Agent, or Firm* — KDW FIRM PLLC

(57) ABSTRACT

Embodiments are generally directed to systems, device, and techniques to utilize a uniform resource locator to exchange money.

20 Claims, 13 Drawing Sheets

(56)                References Cited

U.S. PATENT DOCUMENTS

| | | | |
|---|---|---|---|
| 5,778,072 A | 7/1998 | Samar | |
| 5,796,827 A | 8/1998 | Coppersmith et al. | |
| 5,832,090 A | 11/1998 | Raspotnik | |
| 5,883,810 A | 3/1999 | Franklin et al. | |
| 5,901,874 A | 5/1999 | Deters | |
| 5,929,413 A | 7/1999 | Gardner | |
| 5,960,411 A | 9/1999 | Hartman et al. | |
| 6,021,203 A | 2/2000 | Douceur et al. | |
| 6,049,328 A | 4/2000 | Vanderheiden | |
| 6,058,373 A | 5/2000 | Blinn et al. | |
| 6,061,666 A | 5/2000 | Do et al. | |
| 6,105,013 A | 8/2000 | Curry et al. | |
| 6,199,114 B1 | 3/2001 | White et al. | |
| 6,199,762 B1 | 3/2001 | Hohle | |
| 6,216,227 B1 | 4/2001 | Goldstein et al. | |
| 6,227,447 B1 | 5/2001 | Campisano | |
| 6,282,522 B1 | 8/2001 | Davis et al. | |
| 6,324,271 B1 | 11/2001 | Sawyer et al. | |
| 6,342,844 B1 | 1/2002 | Rozin | |
| 6,367,011 B1 | 4/2002 | Lee et al. | |
| 6,402,028 B1 | 6/2002 | Graham, Jr. et al. | |
| 6,438,550 B1 | 8/2002 | Doyle et al. | |
| 6,501,847 B2 | 12/2002 | Helot et al. | |
| 6,572,015 B1 | 6/2003 | Norton | |
| 6,631,197 B1 | 10/2003 | Taenzer | |
| 6,641,050 B2 | 11/2003 | Kelley et al. | |
| 6,655,585 B2 | 12/2003 | Shinn | |
| 6,662,020 B1 | 12/2003 | Aaro et al. | |
| 6,721,706 B1 | 4/2004 | Strubbe et al. | |
| 6,731,778 B1 | 5/2004 | Oda et al. | |
| 6,779,115 B1 | 8/2004 | Naim | |
| 6,792,533 B2 | 9/2004 | Jablon | |
| 6,829,711 B1 | 12/2004 | Kwok et al. | |
| 6,834,271 B1 | 12/2004 | Hodgson et al. | |
| 6,834,795 B1 | 12/2004 | Rasmussen et al. | |
| 6,852,031 B1 | 2/2005 | Rowe | |
| 6,865,547 B1 | 3/2005 | Brake, Jr. et al. | |
| 6,873,260 B2 | 3/2005 | Lancos et al. | |
| 6,877,656 B1 | 4/2005 | Jaros et al. | |
| 6,889,198 B2 | 5/2005 | Kawan | |
| 6,905,411 B2 | 6/2005 | Nguyen et al. | |
| 6,910,627 B1 | 6/2005 | Simpson-Young et al. | |
| 6,971,031 B2 | 11/2005 | Haala | |
| 6,990,588 B1 | 1/2006 | Yasukura | |
| 7,006,986 B1 | 2/2006 | Sines et al. | |
| 7,085,931 B1 | 8/2006 | Smith et al. | |
| 7,127,605 B1 | 10/2006 | Montgomery et al. | |
| 7,128,274 B2 | 10/2006 | Kelley et al. | |
| 7,140,550 B2 | 11/2006 | Ramachandran | |
| 7,152,045 B2 | 12/2006 | Hoffman | |
| 7,165,727 B2 | 1/2007 | de Jong | |
| 7,175,076 B1 | 2/2007 | Block et al. | |
| 7,202,773 B1 | 4/2007 | Oba et al. | |
| 7,206,806 B2 | 4/2007 | Pineau | |
| 7,232,073 B1 | 6/2007 | de Jong | |
| 7,246,752 B2 | 7/2007 | Brown | |
| 7,252,242 B2 | 8/2007 | Ho | |
| 7,254,569 B2 | 8/2007 | Goodman et al. | |
| 7,263,507 B1 | 8/2007 | Brake, Jr. et al. | |
| 7,270,276 B2 | 9/2007 | Vayssiere | |
| 7,278,025 B2 | 10/2007 | Saito et al. | |
| 7,287,692 B1 | 10/2007 | Patel et al. | |
| 7,290,709 B2 | 11/2007 | Tsai et al. | |
| 7,306,143 B2 | 12/2007 | Bonneau, Jr. et al. | |
| 7,319,986 B2 | 1/2008 | Praisner et al. | |
| 7,325,132 B2 | 1/2008 | Takayama et al. | |
| 7,373,515 B2 | 5/2008 | Owen et al. | |
| 7,374,099 B2 | 5/2008 | de Jong | |
| 7,375,616 B2 | 5/2008 | Rowse et al. | |
| 7,380,710 B2 | 6/2008 | Brown | |
| 7,424,977 B2 | 9/2008 | Smets et al. | |
| 7,453,439 B1 | 11/2008 | Kushler et al. | |
| 7,472,829 B2 | 1/2009 | Brown | |
| 7,487,357 B2 | 2/2009 | Smith et al. | |
| 7,527,208 B2 | 5/2009 | Hammad | |
| 7,568,631 B2 | 8/2009 | Gibbs et al. | |
| 7,584,153 B2 | 9/2009 | Brown et al. | |
| 7,597,250 B2 | 10/2009 | Finn | |
| 7,628,322 B2 | 12/2009 | Holtmanns et al. | |
| 7,652,578 B2 | 1/2010 | Braun et al. | |
| 7,689,832 B2 | 3/2010 | Talmor et al. | |
| 7,703,142 B1 | 4/2010 | Wilson et al. | |
| 7,748,609 B2 | 7/2010 | Sachdeva et al. | |
| 7,748,617 B2 | 7/2010 | Gray | |
| 7,748,636 B2 | 7/2010 | Finn | |
| 7,762,457 B2 | 7/2010 | Bonalle et al. | |
| 7,789,302 B2 | 9/2010 | Tame | |
| 7,793,851 B2 | 9/2010 | Mullen | |
| 7,796,013 B2 | 9/2010 | Murakami et al. | |
| 7,801,799 B1 | 9/2010 | Brake, Jr. et al. | |
| 7,801,829 B2 | 9/2010 | Gray et al. | |
| 7,805,755 B2 | 9/2010 | Brown et al. | |
| 7,809,643 B2 | 10/2010 | Phillips et al. | |
| 7,827,115 B2 | 11/2010 | Weller et al. | |
| 7,828,214 B2 | 11/2010 | Narendra et al. | |
| 7,848,746 B2 | 12/2010 | Juels | |
| 7,882,553 B2 | 2/2011 | Tuliani | |
| 7,900,048 B2 | 3/2011 | Andersson | |
| 7,908,216 B1 | 3/2011 | Davis et al. | |
| 7,922,082 B2 | 4/2011 | Muscato | |
| 7,933,589 B1 | 4/2011 | Mamdani et al. | |
| 7,949,559 B2 | 5/2011 | Freiberg | |
| 7,954,716 B2 | 6/2011 | Narendra et al. | |
| 7,954,723 B2 | 6/2011 | Charrat | |
| 7,962,369 B2 | 6/2011 | Rosenberg | |
| 7,993,197 B2 | 8/2011 | Kaminkow | |
| 8,005,426 B2 | 8/2011 | Huomo et al. | |
| 8,010,405 B1 | 8/2011 | Bortolin et al. | |
| RE42,762 E | 9/2011 | Shin et al. | |
| 8,041,954 B2 | 10/2011 | Plesman | |
| 8,060,012 B2 | 11/2011 | Sklovsky et al. | |
| 8,074,877 B2 | 12/2011 | Mullen et al. | |
| 8,082,450 B2 | 12/2011 | Frey et al. | |
| 8,095,113 B2 | 1/2012 | Kean et al. | |
| 8,099,332 B2 | 1/2012 | Lemay et al. | |
| 8,103,249 B2 | 1/2012 | Markison | |
| 8,108,687 B2 | 1/2012 | Ellis et al. | |
| 8,127,143 B2 | 2/2012 | Abdallah et al. | |
| 8,135,648 B2 | 3/2012 | Oram et al. | |
| 8,140,010 B2 | 3/2012 | Symons et al. | |
| 8,141,136 B2 | 3/2012 | Lee et al. | |
| 8,150,321 B2 | 4/2012 | Winter et al. | |
| 8,150,767 B2 | 4/2012 | Wankmueller | |
| 8,186,602 B2 | 5/2012 | Itay et al. | |
| 8,196,131 B1 | 6/2012 | von Behren et al. | |
| 8,215,563 B2 | 7/2012 | Levy et al. | |
| 8,224,753 B2 | 7/2012 | Atef et al. | |
| 8,232,879 B2 | 7/2012 | Davis | |
| 8,233,841 B2 | 7/2012 | Griffin et al. | |
| 8,245,292 B2 | 8/2012 | Buer | |
| 8,249,654 B1 | 8/2012 | Zhu | |
| 8,266,451 B2 | 9/2012 | Leydier et al. | |
| 8,276,814 B1 | 10/2012 | Davis | |
| 8,285,329 B1 | 10/2012 | Zhu | |
| 8,302,872 B2 | 11/2012 | Mullen | |
| 8,312,519 B1 | 11/2012 | Bailey et al. | |
| 8,316,237 B1 | 11/2012 | Felsher et al. | |
| 8,332,272 B2 | 12/2012 | Fisher | |
| 8,346,670 B2 | 1/2013 | Hasson | |
| 8,365,988 B1 | 2/2013 | Medina, III et al. | |
| 8,369,960 B2 | 2/2013 | Tran et al. | |
| 8,371,501 B1 | 2/2013 | Hopkins | |
| 8,381,307 B2 | 2/2013 | Cimino | |
| 8,391,719 B2 | 3/2013 | Alameh et al. | |
| 8,417,231 B2 | 4/2013 | Sanding et al. | |
| 8,439,271 B2 | 5/2013 | Smets et al. | |
| 8,475,367 B1 | 7/2013 | Yuen et al. | |
| 8,489,112 B2 | 7/2013 | Roeding et al. | |
| 8,511,542 B2 | 8/2013 | Pan | |
| 8,511,547 B2 | 8/2013 | Rans | |
| 8,519,822 B2 | 8/2013 | Riegebauer | |
| 8,559,872 B2 | 10/2013 | Butler | |
| 8,566,916 B1 | 10/2013 | Bailey et al. | |
| 8,567,670 B2 | 10/2013 | Stanfield et al. | |

(56)                References Cited

U.S. PATENT DOCUMENTS

| | | | |
|---|---|---|---|
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B2 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |

(56) References Cited

U.S. PATENT DOCUMENTS

| | | |
|---|---|---|
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0144198 A1* | 6/2012 | Har .................... H04L 9/14 713/170 |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |

(56) References Cited

U.S. PATENT DOCUMENTS

| | | |
|---|---|---|
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0164229 A1* | 6/2014 | Jones .................. G06Q 20/223 705/39 |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek et al. |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |

(56) References Cited

U.S. PATENT DOCUMENTS

| | | |
|---|---|---|
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2020/0106615 A1 | 4/2020 | Rule et al. |
| 2020/0250659 A1 | 8/2020 | Rule et al. |
| 2021/0004806 A1 | 1/2021 | Noe |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | | |
|---|---|---|---|
| CN | 103023643 A | 4/2013 | |
| CN | 103417202 A | 12/2013 | |
| EP | 1085424 A1 | 3/2001 | |
| EP | 1223565 A1 | 7/2002 | |
| EP | 1265186 A2 | 12/2002 | |
| EP | 1783919 A1 | 5/2007 | |
| EP | 2139196 A1 | 12/2009 | |
| EP | 1469419 A1 | 8/2012 | |
| EP | 2852070 A1 | 3/2015 | |
| EP | 3582166 A1 | 12/2019 | |
| GB | 2457221 A | 8/2009 | |
| GB | 2516861 A | 2/2015 | |
| GB | 2551907 A | 1/2018 | |
| JP | 2004272470 A | 9/2004 | |
| KR | 101508320 B1 | 4/2015 | |
| KR | 20150140132 A | 12/2015 | |
| NO | 2008055170 A2 | 5/2008 | |
| WO | 9910824 A1 | 3/1999 | |
| WO | 0049586 A1 | 8/2000 | |
| WO | 2006070189 A2 | 7/2006 | |
| WO | 2009025605 A2 | 2/2009 | |
| WO | 2010049252 A1 | 5/2010 | |
| WO | 2011112158 A1 | 9/2011 | |
| WO | 2012001624 A1 | 1/2012 | |
| WO | 2013039395 A1 | 3/2013 | |
| WO | 2013155562 A1 | 10/2013 | |
| WO | 2013192358 A2 | 12/2013 | |
| WO | 2014043278 A1 | 3/2014 | |
| WO | 2014170741 A2 | 10/2014 | |
| WO | 2015179649 A1 | 11/2015 | |
| WO | 2015183818 A1 | 12/2015 | |
| WO | 2016097718 A1 | 6/2016 | |
| WO | 2016160816 A1 | 10/2016 | |
| WO | 2016168394 A1 | 10/2016 | |
| WO | 2017042375 A1 | 3/2017 | |
| WO | 2017042400 A1 | 3/2017 | |
| WO | 2017047855 A1 | 3/2017 | |
| WO | 2017157859 A1 | 9/2017 | |
| WO | 2017208063 A1 | 12/2017 | |
| WO | 2018063809 A1 | 4/2018 | |
| WO | 2018137888 A1 | 8/2018 | |
| WO | 2019022585 A1 | 1/2019 | |
| WO | WO-2019199422 A1 * | 10/2019 | ......... G06Q 20/3223 |
| WO | WO-2020072440 A1 * | 4/2020 | ............ G06F 21/35 |
| WO | 2021051884 A1 | 3/2021 | |
| WO | 2021133492 A1 | 7/2021 | |
| WO | 2022108959 A1 | 5/2022 | |
| WO | 2022187350 A1 | 9/2022 | |
| WO | 2023017943 A1 | 2/2023 | |
| WO | 2023064063 A1 | 4/2023 | |

OTHER PUBLICATIONS

Haykin, M. and Warnar, R., "Smart Card Technology: New Methods for Computer Access Control", Computer Science and Technology NIST Special Publication 500-157:1-60 (1988).
Lehpamer, H., "Component of the RFID System", RFID Design Principles, 2nd edition pp. 133-201 (2012).
Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.
Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

(56) References Cited

OTHER PUBLICATIONS

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

International Search Report and Written Opinion for Application No. PCT/US2022/021272, mailed Jul. 11, 2022, 12 pages.

Author Unknown, "Global expansion of card tapping mobile OTP for security and convenience is imminent," Jun. 28, 2022, website: https://www.swidch.com/blogs/card-tapping-motp-blog.

Emvco: "EMV Card Personalisation Specification", Aug. 1, 2021, pp. 1-114, Retrieved from the Internet: URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

* cited by examiner

Figure 3:
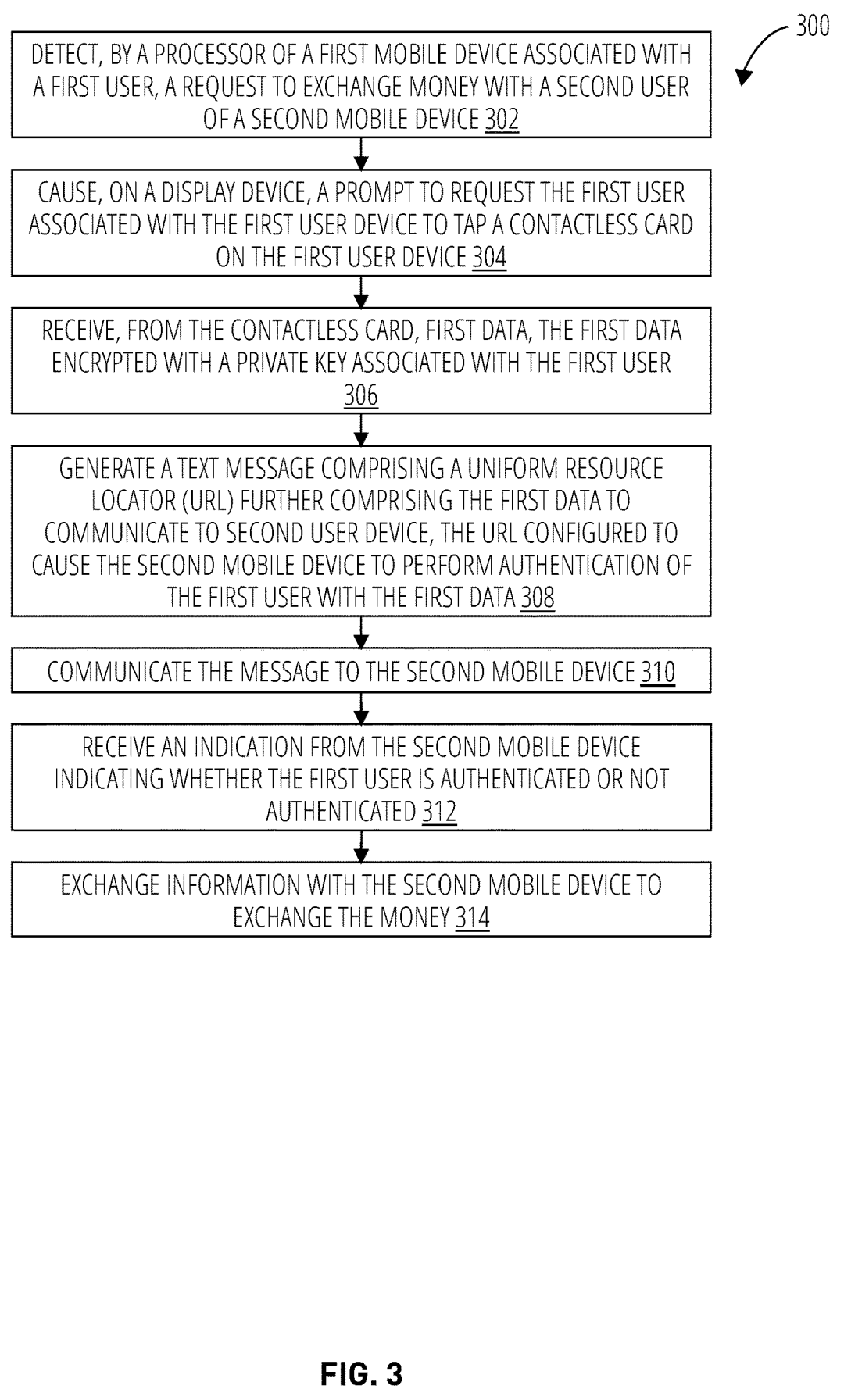

300

DETECT, BY A PROCESSOR OF A FIRST MOBILE DEVICE ASSOCIATED WITH A FIRST USER, A REQUEST TO EXCHANGE MONEY WITH A SECOND USER OF A SECOND MOBILE DEVICE 302

CAUSE, ON A DISPLAY DEVICE, A PROMPT TO REQUEST THE FIRST USER ASSOCIATED WITH THE FIRST USER DEVICE TO TAP A CONTACTLESS CARD ON THE FIRST USER DEVICE 304

RECEIVE, FROM THE CONTACTLESS CARD, FIRST DATA, THE FIRST DATA ENCRYPTED WITH A PRIVATE KEY ASSOCIATED WITH THE FIRST USER 306

GENERATE A TEXT MESSAGE COMPRISING A UNIFORM RESOURCE LOCATOR (URL) FURTHER COMPRISING THE FIRST DATA TO COMMUNICATE TO SECOND USER DEVICE, THE URL CONFIGURED TO CAUSE THE SECOND MOBILE DEVICE TO PERFORM AUTHENTICATION OF THE FIRST USER WITH THE FIRST DATA 308

COMMUNICATE THE MESSAGE TO THE SECOND MOBILE DEVICE 310

RECEIVE AN INDICATION FROM THE SECOND MOBILE DEVICE INDICATING WHETHER THE FIRST USER IS AUTHENTICATED OR NOT AUTHENTICATED 312

EXCHANGE INFORMATION WITH THE SECOND MOBILE DEVICE TO EXCHANGE THE MONEY 314

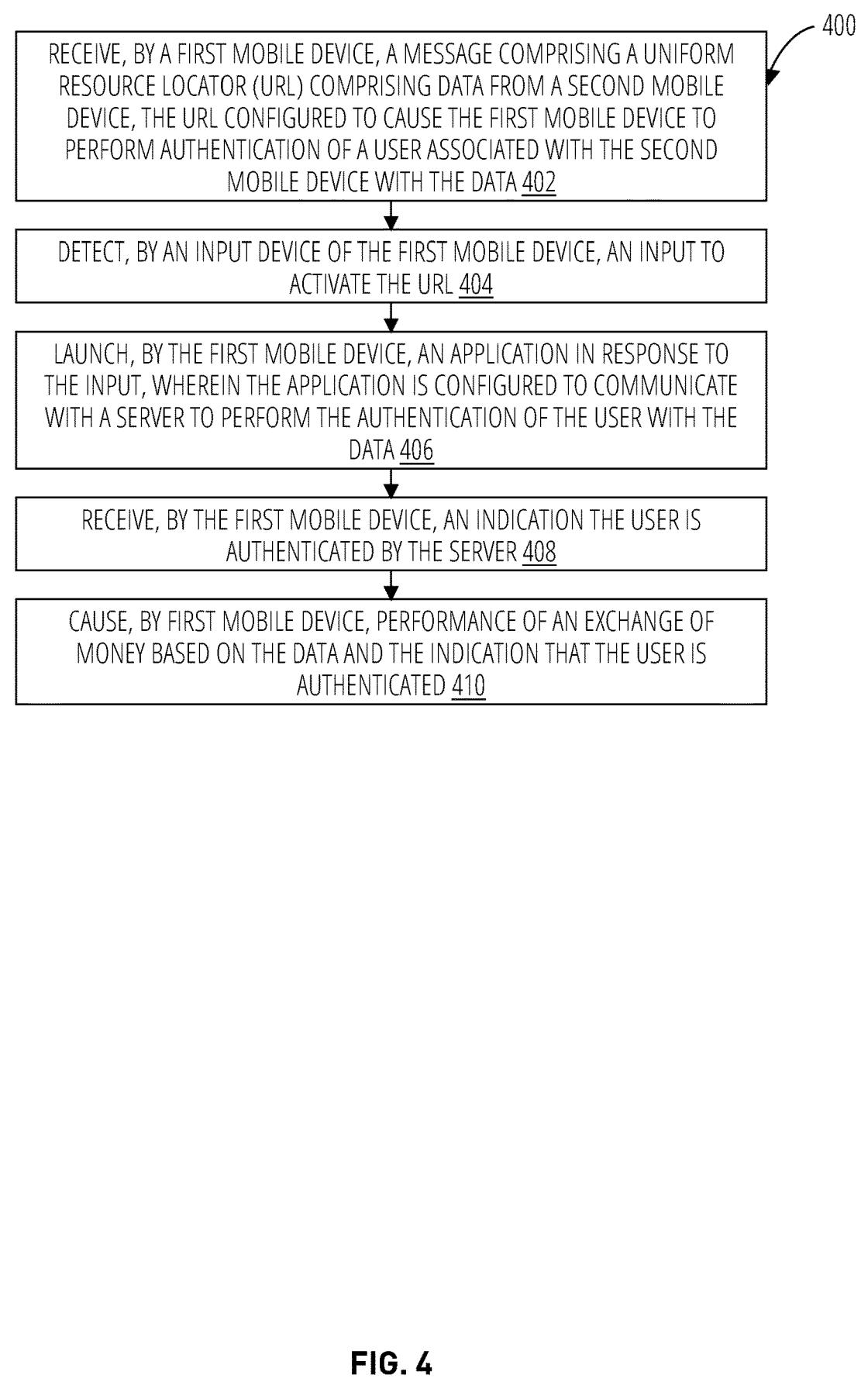

RECEIVE, BY A FIRST MOBILE DEVICE, A MESSAGE COMPRISING A UNIFORM RESOURCE LOCATOR (URL) COMPRISING DATA FROM A SECOND MOBILE DEVICE, THE URL CONFIGURED TO CAUSE THE FIRST MOBILE DEVICE TO PERFORM AUTHENTICATION OF A USER ASSOCIATED WITH THE SECOND MOBILE DEVICE WITH THE DATA <u>402</u>

DETECT, BY AN INPUT DEVICE OF THE FIRST MOBILE DEVICE, AN INPUT TO ACTIVATE THE URL <u>404</u>

LAUNCH, BY THE FIRST MOBILE DEVICE, AN APPLICATION IN RESPONSE TO THE INPUT, WHEREIN THE APPLICATION IS CONFIGURED TO COMMUNICATE WITH A SERVER TO PERFORM THE AUTHENTICATION OF THE USER WITH THE DATA <u>406</u>

RECEIVE, BY THE FIRST MOBILE DEVICE, AN INDICATION THE USER IS AUTHENTICATED BY THE SERVER <u>408</u>

CAUSE, BY FIRST MOBILE DEVICE, PERFORMANCE OF AN EXCHANGE OF MONEY BASED ON THE DATA AND THE INDICATION THAT THE USER IS AUTHENTICATED <u>410</u>

FIG. 4

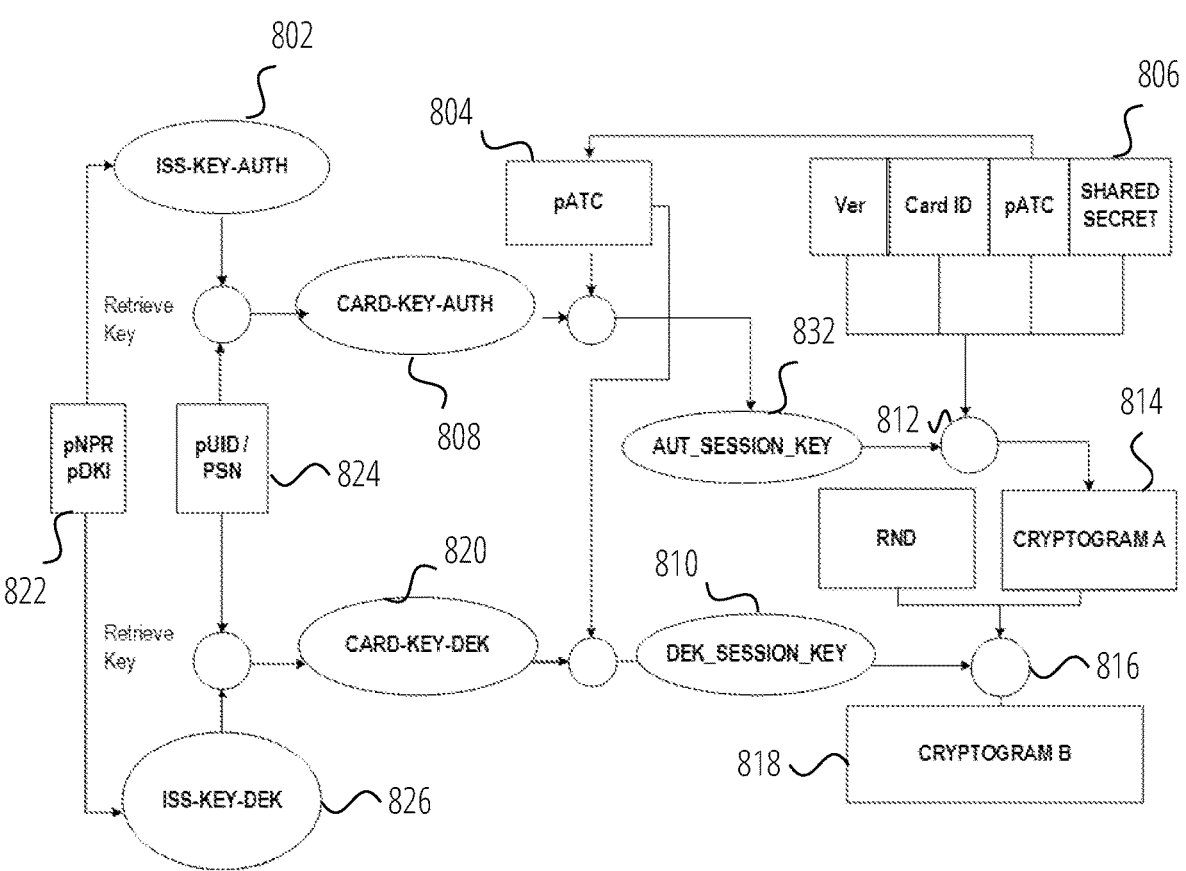
FIG. 8

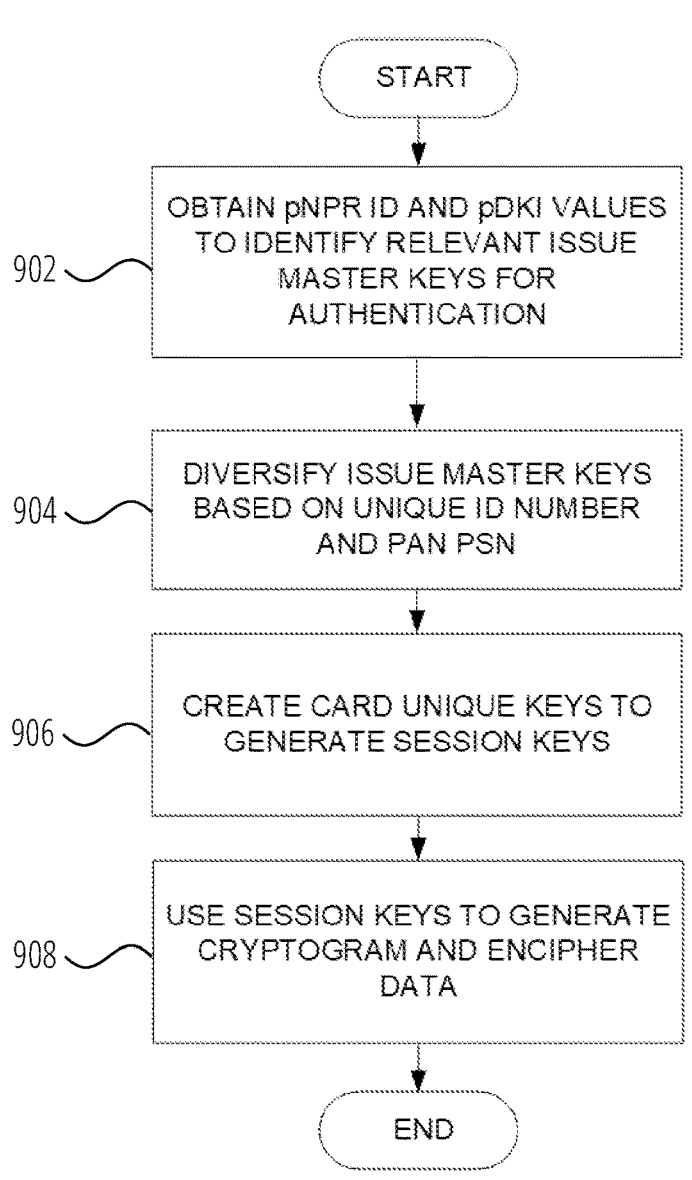
FIG. 9

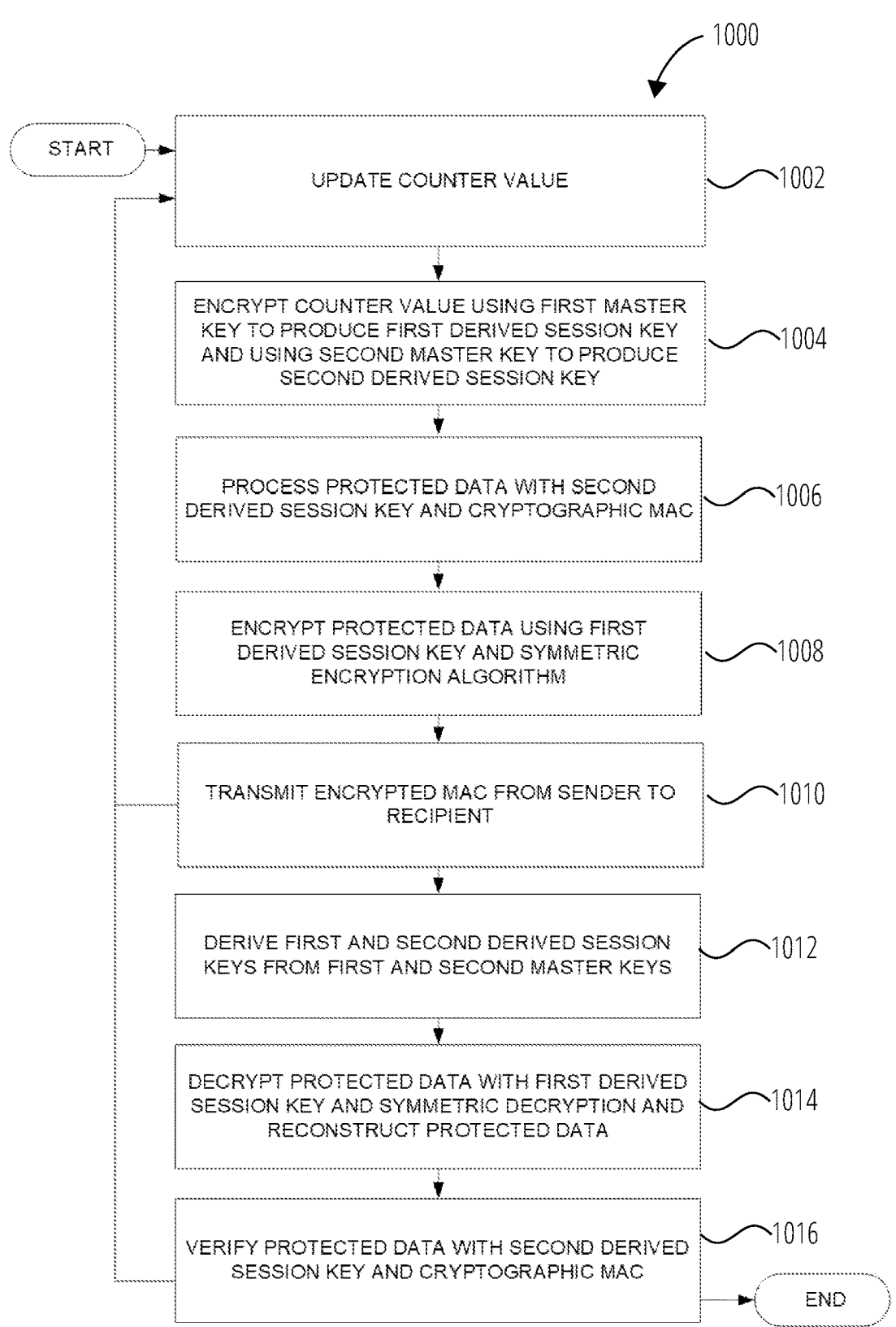

1000

START

UPDATE COUNTER VALUE — 1002

ENCRYPT COUNTER VALUE USING FIRST MASTER KEY TO PRODUCE FIRST DERIVED SESSION KEY AND USING SECOND MASTER KEY TO PRODUCE SECOND DERIVED SESSION KEY — 1004

PROCESS PROTECTED DATA WITH SECOND DERIVED SESSION KEY AND CRYPTOGRAPHIC MAC — 1006

ENCRYPT PROTECTED DATA USING FIRST DERIVED SESSION KEY AND SYMMETRIC ENCRYPTION ALGORITHM — 1008

TRANSMIT ENCRYPTED MAC FROM SENDER TO RECIPIENT — 1010

DERIVE FIRST AND SECOND DERIVED SESSION KEYS FROM FIRST AND SECOND MASTER KEYS — 1012

DECRYPT PROTECTED DATA WITH FIRST DERIVED SESSION KEY AND SYMMETRIC DECRYPTION AND RECONSTRUCT PROTECTED DATA — 1014

VERIFY PROTECTED DATA WITH SECOND DERIVED SESSION KEY AND CRYPTOGRAPHIC MAC — 1016

END

SYSTEMS AND TECHNIQUES TO UTILIZE AN ACTIVE LINK IN A UNIFORM RESOURCE LOCATOR TO PERFORM A MONEY EXCHANGE

BACKGROUND

There are many types of electronic payment systems that allow users to exchange money with other users (i.e., peer-to-peer payment transactions). In theory, conventional electronic payment systems provide a convenient method for transferring money between users. Conventional electronic payment systems, however, have several drawbacks that often cause users frustration, confusion and result in an unsatisfactory exchange. One such drawback of conventional electronic payment systems is that they are typically standalone systems to which both the sender and the recipient must subscribe and require a user to go through a number of steps to complete a transaction. In some instances, the sender, recipient, or both may have to go through a time-consuming process of setting up an account and providing sensitive financial information to use a system to send or receive a payment through another banking system. Often times the users may rarely use the electronic payment system after an initial transaction.

The limited nature of conventional electronic payment systems also adds inconvenience. In particular, the stand-alone nature of conventional electronic payment systems typically requires that users open a separate application dedicated just to payment transactions in order to send or receive a payment. The inconvenience of the standalone nature of conventional electronic payment systems can discourage users of using such systems. Accordingly, there are a number of disadvantages with conventional electronic payment systems and methods.

BRIEF SUMMARY

Embodiments may include systems, devices, techniques, and methods including a mobile device including a display device, a processor, and memory. The memory may include instructions, that when executed by the processor, cause the processor to receive an input to perform an electronic exchange of money with a second mobile device of a first user, cause the display device to present an indication to provide a contactless card on the mobile device, receive, from the contactless card, first data, the first data encrypted with a private key of a second user, generate a message comprising a uniform resource locator (URL) comprising the first data to communicate to the second mobile device, the URL configured to cause the second mobile device to perform authentication of the second user with the first data, communicate the message to the second mobile device, and cause the electronic exchange of money based on the authentication of the second user.

Embodiments also include systems, devices, techniques, and methods including a mobile device including an input device, a processor, and memory. The memory may include instructions that when executed by the processor, cause the processor to receive a message comprising a uniform resource locator (URL) comprising first data from a second mobile device, the URL configured to cause the mobile device to perform authentication of a first user with the first data, detect, via the input device, an input to activate the URL, launch an application in response to the input, wherein the application is configured to communicate with a server to perform the authentication of the first user with the first data, receive an indication that the first user is authenticated by the server, and cause performance of an exchange of money based on the first data and the indication that the first user is authenticated.

Embodiments also include systems, devices, techniques, and methods include a computer-implemented method including detecting, by a processor of a first mobile device associated with a first user, a request to exchange money with a second user of a second mobile device, causing, on a display device, a prompt to request the first user associated with the first user device to tap a contactless card on the first user device, receiving, from the contactless card, first data, the first data encrypted with a private key associated with the first user, generating a text message comprising a uniform resource locator (URL) further comprising the first data to communicate to second user device, the URL configured to cause the second mobile device to perform authentication of the first user with the first data, communicating the message to the second mobile device, receiving an indication from the second mobile device indicating the first user is authenticated, and exchanging information with the second mobile device to exchange the money.

BRIEF DESCRIPTION OF THE SEVERAL VIEWS OF THE DRAWINGS

FIG. 3 illustrates a routine 300 in accordance with embodiments discussed herein.

FIG. 4 illustrates a routine 400 in accordance with embodiments discussed herein.

FIG. 8 is a diagram of a key system 800 in accordance with embodiments.

FIG. 9 is example of a flowchart 900 for generating a cryptogram according to embodiments.

FIG. 10 illustrates an example of a flowchart 1000 in accordance with embodiments.

DETAILED DESCRIPTION

Embodiments discussed herein may be generally directed to devices, systems, and techniques to enable users to exchange money in a secure streamlined manner. For example, a user using their mobile device may send money to another user via their mobile device. The exchange may be performed by the sender interacting with a banking application on the mobile device. Specifically, the banking application may be configured to enable a user to enter a person or contact, enter an amount of money, and send the money to the specific person or contact. The sender's banking application may generate a message that includes information to identify the sender and an amount of money.

The message may be sent to the recipient's mobile device to initiate the exchange. In some instances, the message may include a Uniform resource locator (URL) embedded with the information. The URL maybe may be invoked by the recipient to automatically launch a banking application on the recipient's mobile device to authenticate the sender and perform the exchange.

As will be discussed in more detail in the following description, the techniques are more secure and streamlined than previous solutions because they utilize a contactless card including secure data associated with the sender to authenticate the sender. The secure data may be embedded in the URL and communicated to the recipient's mobile device in the message. The recipient's mobile device may authenticate the sender, either locally or remotely via a server, and then proceed with performing the exchange based on the results of the authentication process.

Additionally, the exchange may occur with a minimal number of actions performed by the sender and recipient. For example, the sender may select or enter a contact, enter an amount of money, and tap their contactless card on the mobile device to perform the exchange. The recipient may read the message and activate the URL, and confirm the exchange of the money. The exchange may occur based on the operations performed by the sender's mobile device, the recipient's mobile device, and a banking system or third-party system. Details are discussed in the following description.

Figure 1:
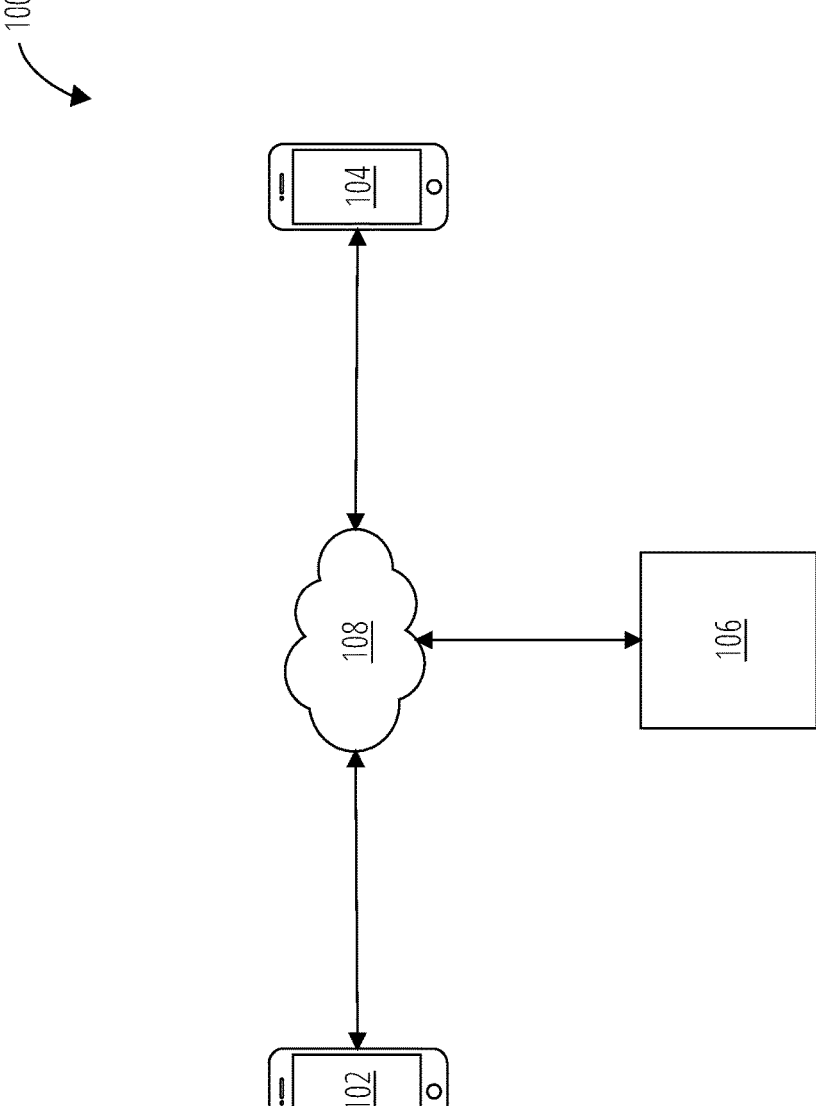
FIG. 1 illustrates an example of a system 100 in accordance with embodiments discussed herein.

FIG. 1 illustrates an example of a system 100 to perform the operations discussed herein including enabling users to exchange money via mobile devices. The illustrated system 100 includes a limited number of components and devices for discussion purposes. In embodiments, the system 100 includes any number of servers, devices, networking equipment, etc., configured to enable any number of users to send money to other users via devices.

In FIG. 1, the system 100 includes mobile device 102, mobile device 104, and system 106, which all may be coupled via network 108, e.g., the Internet. Examples of a mobile device may include a cellular telephone, a personal digital assistant, a tablet computer, etc., and are configured to communicate in accordance with cellular protocols, wireless protocols, and so forth. In one example, a mobile device may include a housing made of a material, such as metal or plastic, and include components, such as one or more processors, memory, storage, input devices (touchscreen interface, buttons, sensors, microphone, etc.), output devices (display, speaker, vibration device, haptic device, etc.), short-range communication radios, antenna(s), etc.

In the illustrated example, mobile device 102 may communicate with mobile device 104 via network 108, and vice versa. In some instances, the mobile devices may communicate with each other over other networks, such as a local area network, a wireless local area network, a wide area network, etc. The mobile devices may also be configured to establish a secure point-to-point (P2P) connection or a direct connection between each other. The P2P or direct connection may be established utilizing a protocol, such as Bluetooth Low Energy (BLE), Bluetooth, Wireless Fidelity (WiFi), HaLow (IEEE 802.11ah), Z-wave, or Zigbee.

In embodiments, a mobile device includes software, such as an operating system and applications or apps. The operating system may be any type of operating, such as ANDRIOD®, IOS®, or WINDOWS®, and configured to manage the mobile device's hardware, software resources, and provide services for the other applications. The applications may be software applications design to operate on the mobile device and provide services and experiences for users. Examples of applications include productivity applications, e.g., email applications, messaging applications, phone applications, contact databases, calendar applications, etc. Other applications may include gaming applications, map applications, location-based services, etc.

In embodiments discussed herein, a mobile device may also include a banking application associated with one or more banking accounts and is configured to provide banking services for users including enabling users to send and receive money between each other. The banking application may also be configured to provide additional banking services, e.g., manage accounts, pay bills, review accounts, etc. At a high level, the banking application may be configured to present information to users in one or more graphical user interface (GUI) displays, process user inputs and selections, communicate with other applications, communicate with one or more backend systems (banking server(s)) and services, and so forth to provide the banking services.

The mobile devices 102 and 104 may also be coupled with system 106 via network 108. System 106 may include one or more servers or computing devices, and provide one or more services for mobile applications to send/receive money. In one example, the system 106 may be a banking system configured to perform authentication operations to authenticate a user requesting to send money to another user or requesting money from another user. System 106 may also provide additional services, such as general banking services, account management, payment services, and so forth. Embodiments are not limited in this manner. In some instances, the system 106 may be configured to process the exchange of money between the mobile devices 102 and 104. For example, the system 106 may electronically deduct the money from the sender's account and electronically add the money to the recipient's account. In some instances, the sender may be associated with a first banking system, and the recipient may be associated with a second banking system. The banking systems may communicate data between each other to coordinate the exchange of money. In the following description, FIG. 2 illustrates additional details for performing a transfer of money utilizing system 100.

Figure 2:
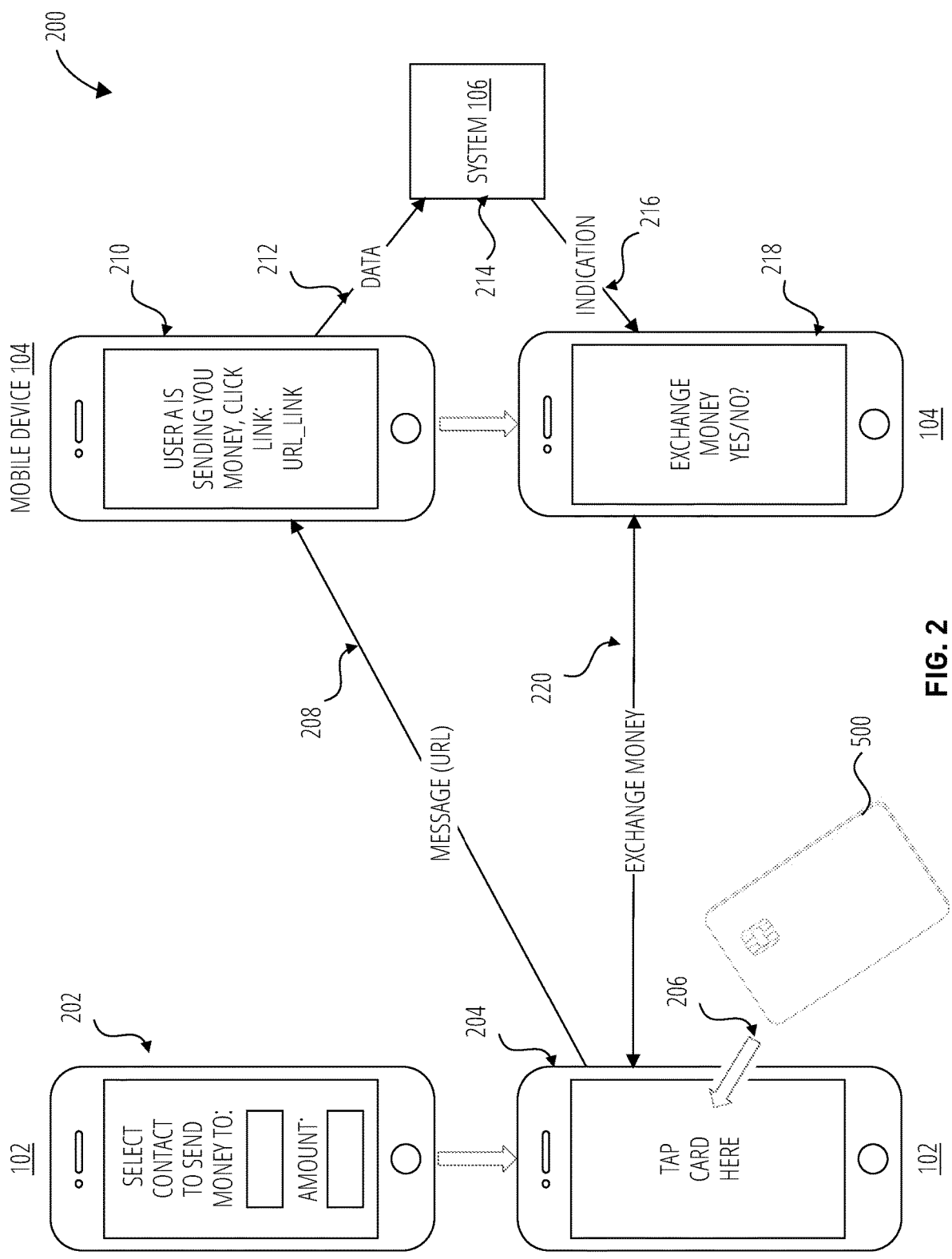
FIG. 2 illustrates an aspect of the subject matter in accordance with one embodiment.

FIG. 2 is an example of a sequence diagram 200 that may be performed in system 100 to send money from a first mobile device 102 to a second mobile device 104. Note that FIG. 2 illustrates one possible sequence, and in some embodiments, one or more operations may occur before, after, and simultaneously as other operations. Also, as will be discussed in more detail below, a user may request money from another user.

At 202, the mobile device 102 may present one or more GUI displays for a user to enter information to send (or request) money. Specifically, the mobile device 102, including a mobile application, such as the banking application or the web browser, presents one or more GUI displays. The displays may be configured for a user to interact with, e.g., make selections, navigate through options and menus, and perform operations. A GUI display may be configured with any type of input element, e.g., entry fields, drop-down menus, touch-based menus or buttons, etc., and the mobile device 102 is configured to process a user input detected by an input device, e.g., button, scroll wheel, touchscreen interface, etc. In the illustrated example, the banking application presents an area for a user to enter a contact and an amount of money. The text field may include features such as auto-complete, suggestions, and be configured to accept the contact in a number of formats, e.g., email address, phone number, username, etc. Embodiments are not limited to the illustrated specific GUI display, and the display may be another format. For example, the banking application may provide a list of contacts from the contact database on the mobile device 102. In some instances, the list may be ordered based on criteria, such as the frequency of use, closest contacts, friends vs. family, etc. In some instances, mobile applications may present more than one GUI display, e.g., a first GUI display (or page) to enter a contact and a second GUI display to enter an amount. As mentioned above, in some instances, the user may request money from another user. In these instances, the user may be presented with similar GUI displays; however, a GUI display provides an indication that the user is requesting money, not sending money.

At 202, the user may select or enter a contact and provide an amount of money to send (or request). The mobile device 102 may process the inputs to determine a device, e.g., mobile device 104, associated with the selected contact. The mobile device 102 is configured to perform an authentication operation to authenticate the user to send or request money. In the illustrated example, the mobile device 102 performs an authentication utilizing a contactless card associated with the user.

At 204, the mobile device 102, including the banking application, may present a GUI display instructing the user to tap the card on the mobile device 102. In some instances, the GUI display may instruct the user to tap the card on a specific surface, e.g., the display or the back of the mobile device 102. Tapping the card on the mobile device 102 initiates an exchange of data between mobile device 102 and the card. Both the mobile device 102 and contactless card 500 are configured to communicate with each other utilizing a short-range communication protocol. For example, the contactless card and the mobile device 102 may perform one or more near field communication (NFC) exchanges. As part of the exchange, the contactless card 500 may be configured to communicate information and data to the 102 that can be used to authenticate the user. For example, at 206, the 500 may send a string, e.g., an alphanumeric sequence of characters, that is stored on the 500 and uniquely identifies the user. In some instances, the contactless card 500 may send the string based on a request or read performed by the mobile device 102. Further, the contactless card 500 may encrypt the string using a private key stored on the contactless card 500 and send the string as an encrypted string to the mobile device 102. The private key may be part of a key pair and associated with a public key that may be used to authenticate the user. In embodiments, the private key may be a proprietary key generated by and associated with the card provider. In other instances, the private key may be associated with performing operations in accordance with the Europay, Mastercard, Visa (EMV) standard.

At 206, the mobile device 102 may process the information received from the contactless card 500 and generate a message to send to a device (mobile device 104) associated with the selected contact. In embodiments, the mobile device 102 may determine to send a message to a mobile device using an identifier or attribute for the contact, e.g., a phone number, username, an electronic mail (email) address, etc. In the illustrated example, the mobile device 102 generates a text message in accordance with a text messaging protocol, e.g., SMS, MMS, RCS, etc. However, in embodiments, other formats may be utilized, e.g., e-mail, real-time messaging, etc., and use protocols such as user datagram protocol (UDP) and transmission control protocol (TCP).

The message may include information to indicate to the recipient that another user wishes to send (or request) money, information received from the contactless card 500, and information based on the user inputs, e.g., selected contact and amount entered. In embodiments, the message may also include an active link or active URL. The active URL may be used by the recipient to facilitate the exchange of money. For example, the recipient may select or activate the URL, which in-turn cases a mobile application to launch of the recipient's device. The active URL may be a deep link to launch a banking app or webpage on the mobile device 104, for example. In embodiments, the URL may be embedded with the information including one or more of the encrypted string generated by the contactless card 500, an identifier of the recipient, an identifier of the amount of money, and an identifier of the sender. The URL may be in the format in accordance with one or more operating systems and APIs. For example, the message may include a URL in the format in accordance with standards and APIs for the operating systems IOS, ANDROID, and/or MICROSOFT. Example formats may include "appam:// <string><recipient identifier><amount identifier>," or "https://site.com/<string>krecipient identifier>/<amount identifier>," but embodiments are not limited this manner.

At 208, the mobile device 102 may send the message to the mobile device 104, i.e., the device associated with the contact. The message may be sent in accordance with one or more communication protocols based on the type of message. At 210, the mobile device 104 may receive the message and present the message on a display device. As mentioned, the message may include an active URL selectable by the user of mobile device 104. The mobile device 104 may present the message in a GUI display of a messaging application. A user may interact with the message and select or click on the URL. The mobile device 104 is configured to detect the user selecting and/or activating the URL and to launch the application or webpage based on the information in the URL. The mobile device 104 may launch an application, such as a banking application or a webpage in a web browser. In embodiments, the mobile device 104, including the application, is also configured to process the information embedded in the URL. For example, the application may process the encrypted string and pass the encrypted string through an API to a system 106 to authenticate the sender at 212. In embodiments, the application may also send the other data to the system 106 including the identifier of the sender, the identifier of the recipient, and the amount.

At 214, the system 106 may authenticate the sender based on the information received from the mobile device 104. For example, the system 106 may utilize the identifier of the sender to perform a lookup to determine a stored authenticated string from a database or a data store. The system 106 may also determine a public key associated with the sender and attempt to decrypt the string. The decrypted string may then be compared to the authenticate string to determine if they match and to authenticate the sender. If the system 106 determines that the strings match, the sender is authenticated, and if they do not match, the sender is not authenticated.

At 216, the system 106 may return a result of the comparison or indication as to whether the sender is authenticated. The indication may be communicated as a result to the API call to perform the authentication operation. At 218, the mobile device 104 may present the indication to the user in a GUI display. In some instances, the mobile device 104 may display an option for the user to accept or decline the money. The mobile device 104 may process a user input to decline the exchange and cease operations or not perform additional operations to exchange the money. Alternatively, the mobile device 104 may process a user input to accept or proceed with the exchange of money and perform additional operations to perform the exchange at 220. For example, the mobile device 104 may provide an indication or communication to mobile device 102 to proceed with sending the money. The mobile device 102 may communicate with one or more backend servers, such as a banking server, an indication to electronically transfer the money to an account associated with the recipient, and mobile device 104. In other instances, the application may communicate with a banking server an indication to proceed with the transfer of money.

In some instances, a secure connection may be established between the mobile device 102 and mobile device 104 to exchange money. The secure connection may be a P2P localized connection between the mobile devices 102 and 104. The mobile device 102 may send the money as an electronic token to the mobile device 104. The mobile device 104 may process the token and communicate with a banking server to provide an indication of the transfer. The token may include information that may be used by the banking server to complete an exchange. The information may include an identifier of the sender, an identifier of the recipient, an amount of money, and so forth. Embodiments are not limited in this manner.

FIG. 3 illustrates an example routine 300 that may be performed by system 100. Specifically, routine 300 may be performed by a mobile device configured to send (or request) money to another user via their mobile device.

In block 302, the routine 300 includes detecting, by a processor of a first mobile device associated with a first user, a request to exchange money with a second user of a second mobile device. For example, the mobile device may include a banking application that may present one or more options for the user to send or request money from another person via a P2P exchange. The user, via the banking application, may provide an input to select whether to send or request money. The user may also provide additional information for the exchange. For example, the application may enable a user to enter a contact or person to send or request the money from and an amount of money for the exchange. The mobile device may receive an input selection via a touchscreen interface to send money to another user, for example. In one example, the input selection may include a selection of a contact from a contact list stored on the mobile device. In other instances, the user may type the contact in a field using a keyboard, such as a physical keyboard or a virtual keyboard. In other instances, the user may provide other identifying information, such as a phone number, an email address, a username, etc. Embodiments may not be limited to these examples.

To perform the exchange of money, the user must be authenticated to the second mobile device and second user. Typical authentication methods may be utilized including providing a password, performing a biometric analysis, sending a code in a text message, and so forth. However, embodiments discussed herein may provide additional security by utilizing a contactless card. In the illustrated routine 300, the first user is authenticated utilizing a contactless card associated with the first user. Using the contactless card to authenticate the user provides advantages over other technologies by ensuring that the user has possession of the card and the contactless card includes a token or string that is unique to the user. As will be discussed in more detail, the token or string may be used to authenticate the user via a third-party, e.g., a banking system or other third-party authentication system. In some instances, the second user may authenticate the first user utilizing a local authenticated string and a public key associated with the first user.

The authentication operation performed with the contactless card includes the mobile device exchanging information with the contactless card, which may be initiated by the user bringing the contactless card within a communication range (NFC communication range is ~10 cm) of the mobile device. At block 304, the routine 300 includes causing, on a display device, a prompt to request the first user associated with the first mobile device to tap the contactless card on the first mobile device. When the contactless card comes within a sufficient range of the mobile device, a connection may be established between the device and the card, the mobile device may be configured to exchange data with the card, and the card may be configured to exchange data with mobile device. Instructing the user to tap the card on the mobile device ensures that the card is brought within the communication range. However, other embodiments may include instructing the user to bring the contactless card close or near the mobile device, and the mobile device may provide an indication, e.g.., displaying a message or icon, lighting an LED, etc., when the card is within communication range.

At block 306, the routine 300 includes receiving data from the contactless card. The data may be encrypted by the contactless card with a private key, e.g., a proprietary private key or EMV based private key, that is associated with the first user and securely stored on the contactless card. In some instances, the contactless card may communicate the data to the mobile device in one or more NFC Data Exchange Format (NDEF) message(s). The encrypted data may include information to identify the first user, such as a token or string, that is also securely stored in the contactless card. The mobile device may provide an indication to the user when the exchange is complete and that a message is to be sent to the second mobile device.

In embodiments, the mobile device may generate and send an indication of the exchange of money to the second mobile device associated with the second user. For example, at block 308, the routine 300 includes generating a text message comprising text including information of the exchange, a uniform resource locator (URL), and the data from the contactless card. The text may identify the sender and an amount of money. The URL may be an active URL or deep link, that when activated by the recipient, causes the receiving mobile device to launch an application and perform an authentication of the first user using the data from the contactless card. In embodiments, the mobile device may generate the message and embed the data in the message and/or in the URL. For example, the data including the encrypted string, may be incorporated into the URL as a parameter. Thus, when the URL is activated, the encrypted string is passed to the launched application. In some instances, the mobile device may include additional information in the URL including an identifier to identify the sender, an identifier to identify the recipient, and a specified amount of money to exchange. The identifiers and specified amount may also be passed to the launched application as parameters and may be used by the application to process the exchange.

At block 310, the routine 300 includes communicating the message to the second mobile device. The message may be a text message and communicated to the second mobile device based on an associated phone number. The text message may be sent in accordance with any type of messaging protocol, such as SMS, MMS, and RCS. In some instances, other mediums may be used to send the message, email, chat applications, and so forth. Embodiments are not limited in this manner.

In embodiments, the second mobile device may receive the message and process the message. For example, the second mobile device may present the message to the second user on a display device in GUI display. When the URL is activated by the second user, the second mobile device may perform additional operations including authenticating the first user. In some instances, the authentication may be performed locally by the second mobile device; and in other instances, the second mobile device may utilize a banking system or other third-party system to authenticate the first user. The second mobile device may determine a result of the authentication operation and provide the result to the first mobile device.

At block 312, the routine 300 includes receiving an indication from the second mobile device indicating whether the first user is authenticated or not authenticated. The indication may be received from the second mobile device in a text message or other communication medium. The indication may include a result of the authentication and an indication as to whether the second user accepts or denies the exchange of money. If the first user cannot be authenticated or the second user denies the exchange, the first and second mobile device may cease operations to exchange the money. Alternatively, if the first user is authenticated and the second user accepts the exchanges, the devices may continue to perform operations to exchange the money. At block 314, the routine 300 includes exchanging information with the second mobile device to exchange the money.

In some instances, e.g., when the first and second mobile devices are remote from each other, e.g., cannot form a localize P2P connection, the mobile devices may perform the exchange of money via a banking system. In an example, the sender and the recipient may have accounts with the same bank and banking system. The banking applications on their respective devices may also be configured to communicate directly with the banking system. In this example, the second mobile device, if the first user is authenticated and the second user accepts the exchange, may communicate an indication to the banking system indicating that the exchange is accepted. The indication may be sent via an API communication from the banking application on the second mobile device to the banking system. The banking system may then electronically perform the transaction by deducting the money from the sender's account and adding the money to the recipient's account. In some instances, the first mobile device may initiate and cause the exchange of money upon reception of the indication that the first user is authenticated and the second user approves of the exchange. Similarly, the first mobile device may communicate with a banking system via the banking application on the first mobile to cause the exchange. The banking system may then perform the exchange as discussed above, e.g., electronically deducting the money from the sender's account and adding the money to the recipient's account.

In embodiments, the first and second users may utilize different banks having different banking systems, and the banking systems may communicate with each other to perform the exchange of money. For example, the first user may provide an identifier to identify the first user's banking system to the second mobile device. Once the exchange is approved, the second mobile device may communicate information to a banking system associated with the second user. The second user's banking system may then communicate with the first user's banking system to perform the exchange. In the other instances, the second mobile device may communicate information to identify the second user's banking system to the first mobile device, and the first mobile device may initiate the exchange by communicating with the first user's banking system.

In some embodiments, the banking application may be a third-party banking application, e.g., an application not operated directly by a banking system. The third-party banking application may be configured on each of the mobile devices including having one or more banking accounts configured to operate with the third-party banking application. Once the exchange is approved, the third-party applications on each of the sender's and recipient's devices may communicate with their respective banks to perform the exchange. In some instances, the third-party application including a third-party system may communicate with the sender's banking system to deduct the money from the sender's account. The third-party system may hold the money for an amount of time to earn a fee or interest and then send the money to the recipient's account. Embodiments are not limited in this manner.

In embodiments, the first and second mobile device may communicate data over a P2P secure connection to exchange the money. For example, in response to the first user being authenticated and the second user approving the exchange, the second mobile device may communicate with the first mobile device to establish a P2P connection. The connection may be established in accordance with a particular P2P protocol, such as BLE, Bluetooth, ZigBee, Wi-Fi, etc. Once the connection is established, the first and/or the second mobile device may initiate an exchange of money by communicating a message. For example, the second mobile device may communicate a request for data or token to exchange the money to the first mobile device. The first mobile device may send data, which may include token or secure information having an indication of the amount of money to exchange, to the second mobile device. The second mobile device may communicate with a banking system to perform the exchange between the banking accounts of the first user and the second user. In some instances, the data may also include an identifier of the sender, an identifier of the recipient, bank account information for the sender, etc. The data may be sent securely and be encrypted.

FIG. 4 illustrates an example routine 400 that may be performed by system 100. Specifically, routine 400 may be performed by a mobile device receiving a communication from another mobile device, the communication indicates that another user wishes to send (or request) money.

At block 402, the routine 400 includes receiving, by a first mobile device associated with a first user, a message comprising text indicating that a user wants to send (or request) money, and a uniform resource locator (URL) comprising data. The text may identify the sender of the message and the amount of money. In embodiments, the message may be received from a second mobile device associated with a second user via a communication protocol, such as SMS, MMS, RCS, or another protocol.

In embodiments, the URL may be an active URL or deep-link, that when activated by the recipient, causes the second mobile device to launch an application and perform an authentication of the second user using the data received from the first mobile device and a contactless card. In embodiments, the data may include a token or encrypted string and be embedded in the URL. The data may be passed to the application, when launched, as a parameter that can be used by the application to perform the authentication of the second user. Other information may also be embedded in the URL, such as identifiers of the first and second users and an amount of money to exchange.

At block 404, the routine 400 includes detecting, by the first mobile device, an input to activate the URL. For example, the first mobile device may include an input device, such as a touchscreen interface and the user may select or "click" on the URL. Embodiments are not limited to this example, and the input may be provided via another input device, e.g., a button, a microphone (voice instruction), and so forth.

In block 406, the routine 400 includes launching, by the first mobile device, an application in response to the input, wherein the application is configured to communicate with a server to perform the authentication of the second user with the data. As mentioned, the URL may be a deep link, which may point to a location or provides instructions that are processed by the operating system to launch the application. For example, the URL may indicate a specific application to launch or point to a website to launch in a web browser. In some instances, the URL may include an indication or specify a landing spot or location to launch the application. Thus, the application or web browser may open to a GUI display displaying information for the exchange of money, e.g., sender/request's name, contact information, an amount of money, etc. In embodiments, the URL may include the data, such as the token or encrypted string, an identifier to identify the sender, an identifier to identify the recipient, and an indication of the amount of money that may be passed to the application as parameters when the application is launched.

In embodiments, the first mobile device, including the launched application, may initiate an authentication operation to authenticate the second user when the URL is activated. Specifically, the launched application may utilize the information embedded in the URL, e.g., the token or encrypted string, to authenticate the user. In some instances, the application may perform the authentication operation locally by decrypting the encrypted string and comparing the decrypted string to an authenticated string. In some instances, the first mobile device may first obtain the authenticated string from a banking system in a secure communication.

In the illustrated example, the second mobile device including the application, may send the encrypted string to a server of the banking system or a third-party system to perform the authentication operation. The application may send the data including the encrypted string to the server via API communication(s). The server may decrypt the encrypted string based on a public key associated with the second user, and compare the decrypted string to an authenticated string stored on the banking system. If the strings match, the second user may be authenticated, and vice versa.

At block 408, the routine 400 includes receiving, by the first mobile device, an indication of whether the second user is authenticated by the server. The indication may be returned to the application in response to the API communication(s). In some instances, the GUI display may display an indication that an authentication operation is being performed to authenticate the second user and the results of the authentication operation once they are determined. If the user cannot be authenticated, the operations to exchange money may cease. If the user is authenticated, the application may request the first user to confirm that they want to proceed with the exchange of money.

In response to the second user being authenticated and the first user confirming the transaction, at block 410, the routine 400 includes causing, by the first mobile device, performance of an exchange of money. As discussed above in FIG. 3, the first mobile device may communicate with one or more banking systems to perform the exchange of money. In other instances, the first mobile device may send an indication that authentication was successful and that the first user approves the exchange to the second mobile device (sender's device). The second mobile device may communicate with the one or more banking systems to perform the exchange. In even other instances, a P2P connection may be established between the first and second mobile devices and data may be exchanges between the devices to perform the exchange.

Figure 5:
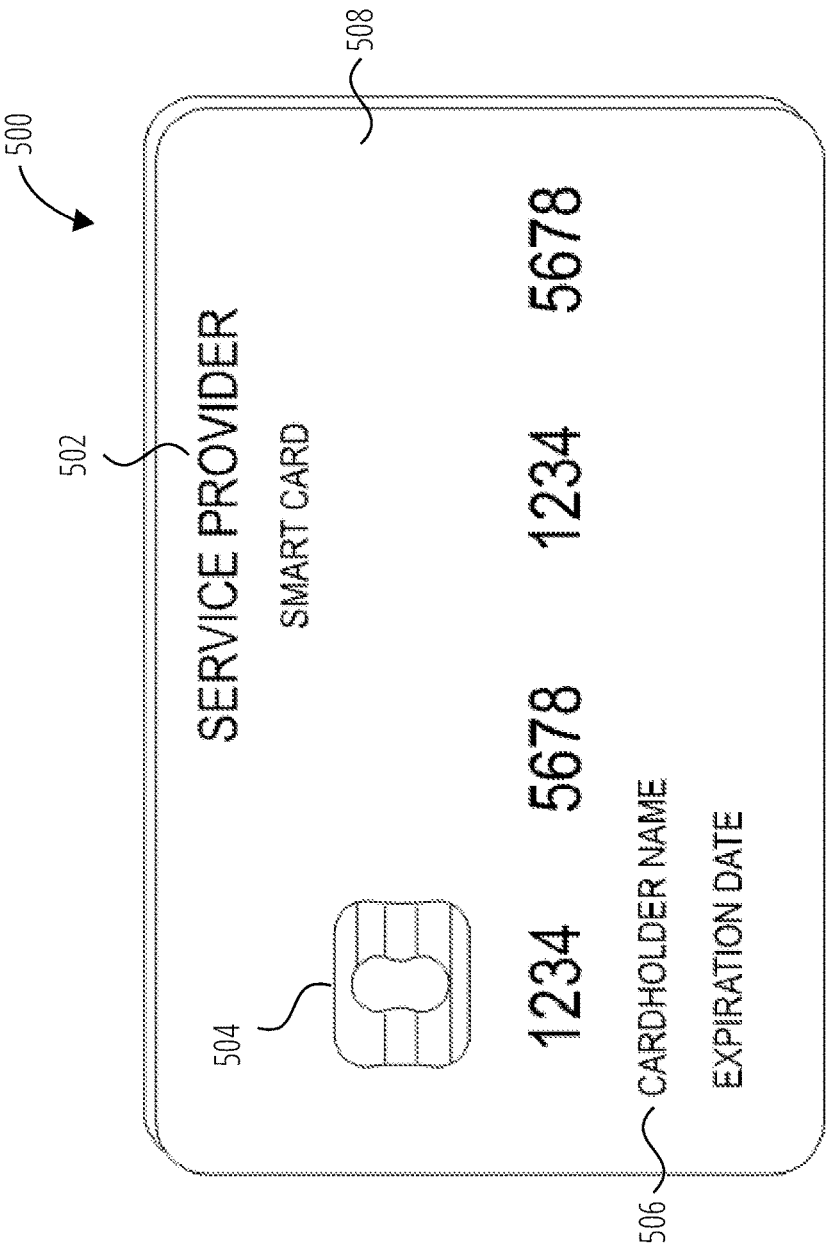
FIG. 5 illustrates a contactless card 500 in accordance with embodiments.

FIG. 5 illustrates an example configuration of a contactless card 500, which may include a contactless card, a payment card, such as a credit card, debit card, or gift card, issued by a service provider as displayed as service provider indicia 502 on the front or back of the contactless card 500. In some examples, the contactless card 500 is not related to a payment card, and may include, without limitation, an identification card. In some examples, the transaction card may include a dual interface contactless payment card, a rewards card, and so forth. The contactless card 500 may include a substrate 508, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 500 may have physical characteristics compliant with the ID-1 format of the ISO/IEC 7816 standard, and the transaction card may otherwise be compliant with the ISO/IEC 14443 standard. However, it is understood that the contactless card 500 according to the present disclosure may have different characteristics, and the present disclosure does not require a transaction card to be implemented in a payment card.

Figure 6:
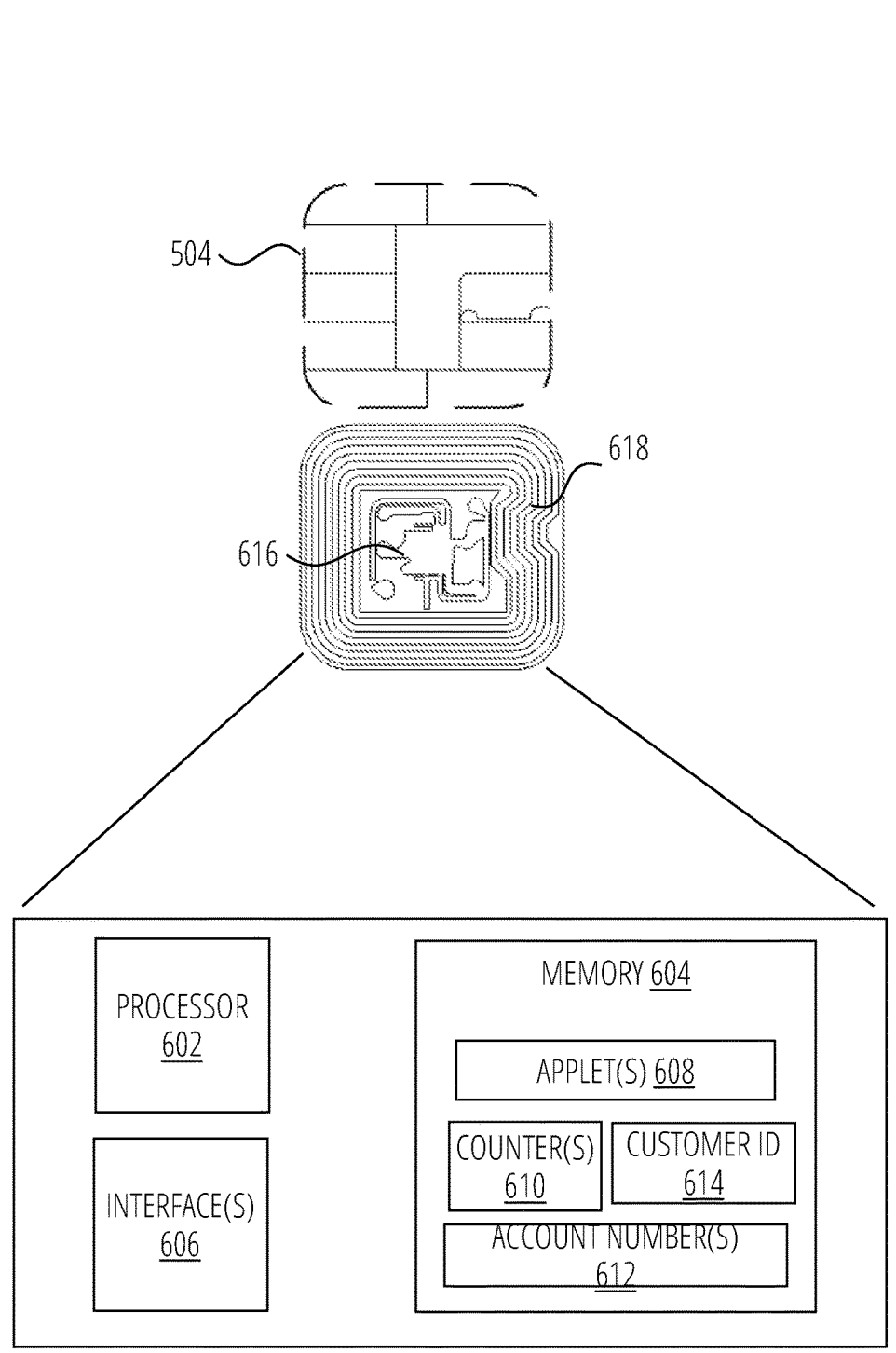
FIG. 6 illustrates a transaction card component 600 in accordance with embodiments.

The contactless card 500 may also include identification information 506 displayed on the front and/or back of the card, and a contact pad 504. The contact pad 504 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 500 may also include processing circuitry, antenna and other components as will be further discussed in FIG. 6. These components may be located behind the contact pad 504 or elsewhere on the substrate 508, e.g. within a different layer of the substrate 508, and may electrically and physically coupled with the contact pad 504. The contactless card 500 may also include a magnetic strip or tape, which may be located on the back of the card (not shown in FIG. 5). The contactless card 500 may also include a Near-Field Communication (NFC) device coupled with an antenna capable of communicating via the NFC protocol. Embodiments are not limited in this manner.

As illustrated in FIG. 5, the contact pad 504 of contactless card 500 may include processing circuitry 616 for storing, processing, and communicating information, including a processor 602, a memory 604, and one or more interface(s) 606. It is understood that the processing circuitry 616 may contain additional components, including processors, memories, error and parity/CRC checkers, data encoders, anticollision algorithms, controllers, command decoders, security primitives and tamper proofing hardware, as necessary to perform the functions described herein.

The memory 604 may be a read-only memory, write-once read-multiple memory or read/write memory, e.g., RAM, ROM, and EEPROM, and the contactless card 500 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 604 may be encrypted memory utilizing an encryption algorithm executed by the processor 602 to encrypted data.

The memory 604 may be configured to store one or more applet(s) 608, one or more counter(s) 610, a customer identifier 614, such as a token or string, and the account number(s) 612, which may be virtual account numbers. The one or more applet(s) 608 may comprise one or more software applications configured to execute on one or more contactless cards, such as a Java® Card applet. However, it is understood that applet(s) 608 are not limited to Java Card applets, and instead may be any software application operable on contactless cards or other devices having limited memory. The one or more counter(s) 610 may comprise a numeric counter sufficient to store an integer. The customer identifier 614 may comprise a unique alphanumeric identifier, token, or string assigned to a user of the contactless card 500, and the identifier may distinguish the user of the contactless card from other contactless card users. In some examples, the customer identifier 614 may identify both a customer and an account assigned to that customer and may further identify the contactless card 500 associated with the customer's account. In some instances, the memory 604 may include the customer identifier 614 and one or more tokens or additional strings that may be used to identify the customer. As stated, the account number(s) 612 may include thousands of one-time use virtual account numbers associated with the contactless card 500. An applet(s) 608 of the contactless card 500 may be configured to manage the account number(s) 612 (e.g., to select an account number(s) 612, mark the selected account number(s) 612 as used, and transmit the account number(s) 612 to a mobile device for auto filling by an auto filling service.

The processor 602 and memory elements of the foregoing exemplary embodiments are described with reference to the contact pad 504, but the present disclosure is not limited thereto. It is understood that these elements may be implemented outside of the contact pad 504 or entirely separate from it, or as further elements in addition to processor 602 and memory 604 elements located within the contact pad 504.

In some examples, the contactless card 500 may comprise one or more antenna(s) 618. The one or more antenna(s) 618 may be placed within the contactless card 500 and around the processing circuitry 616 of the contact pad 504. For example, the one or more antenna(s) 618 may be integral with the processing circuitry 616 and the one or more antenna(s) 618 may be used with an external booster coil. As another example, the one or more antenna(s) 618 may be external to the contact pad 504 and the processing circuitry 616.

In an embodiment, the coil of contactless card 500 may act as the secondary of an air core transformer. The terminal may communicate with the contactless card 500 by cutting power or amplitude modulation. The contactless card 101 may infer the data transmitted from the terminal using the gaps in the contactless card's power connection, which may be functionally maintained through one or more capacitors. The contactless card 500 may communicate back by switching a load on the contactless card's coil or load modulation. Load modulation may be detected in the terminal's coil through interference. More generally, using the antenna(s) 618, processor 602, and/or the memory 604, the contactless card 101 provides a communications interface to communicate via NFC, Bluetooth, and/or Wi-Fi communications.

As explained above, contactless card 500 may be built on a software platform operable on smart cards or other devices having limited memory, such as JavaCard, and one or more or more applications or applets may be securely executed. Applet(s) 608 may be added to contactless cards to provide a one-time password (OTP) for multifactor authentication (MFA) in various mobile application-based use cases. Applet(s) 608 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 608 may be configured to encode the OTP as an NDEF type 4 well known type text tag. In some examples, NDEF messages may comprise one or more records. The applet(s) 608 may be configured to add one or more static tag records in addition to the OTP record.

In some examples, the one or more applet(s) 608 may be configured to emulate an RFID tag. The RFID tag may include one or more polymorphic tags. In some examples, each time the tag is read, different cryptographic data is presented that may indicate the authenticity of the contactless card. Based on the one or more applet(s) 608, an NFC read of the tag may be processed, the data may be transmitted to a server, such as a server of a banking system, and the data may be validated at the server.

In some examples, the contactless card 500 and server may include certain data such that the card may be properly identified. The contactless card 500 may include one or more unique identifiers, e.g., tokens or strings (not pictured). Each time a read operation takes place, the counter(s) 610 may be configured to increment. In some examples, each time data from the contactless card 500 is read (e.g., by a mobile device), the counter(s) 610 is transmitted to the server for validation and determines whether the counter(s) 610 are equal (as part of the validation) to a counter of the server.

The one or more counter(s) 610 may be configured to prevent a replay attack. For example, if a cryptogram has been obtained and replayed, that cryptogram is immediately rejected if the counter(s) 610 has been read or used or otherwise passed over. If the counter(s) 610 has not been used, it may be replayed. In some examples, the counter that is incremented on the card is different from the counter that is incremented for transactions. The contactless card 101 is unable to determine the application transaction counter(s) 610 since there is no communication between applet(s) 608 on the contactless card 500.

In some examples, the counter(s) 610 may get out of sync. In some examples, to account for accidental reads that initiate transactions, such as reading at an angle, the counter(s) 610 may increment but the application does not process the counter(s) 610. In some examples, when the mobile device 10 is woken up, NFC may be enabled and the device 110 may be configured to read available tags, but no action is taken responsive to the reads.

To keep the counter(s) 610 in sync, an application, such as a background application, may be executed that would be configured to detect when the mobile device 110 wakes up and synchronize with the server of a banking system indicating that a read that occurred due to detection to then move the counter(s) 610 forward. In other examples, Hashed One Time Password may be utilized such that a window of mis-synchronization may be accepted. For example, if within a threshold of 10, the counter(s) 610 may be configured to move forward. But if within a different threshold number, for example within 10 or 1200, a request for performing re-synchronization may be processed which requests via one or more applications that the user tap, gesture, or otherwise indicate one or more times via the user's device. If the counter(s) 610 increases in the appropriate sequence, then it possible to know that the user has done so.

The key diversification technique described herein with reference to the counter(s) 610, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 500, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 500. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 7:
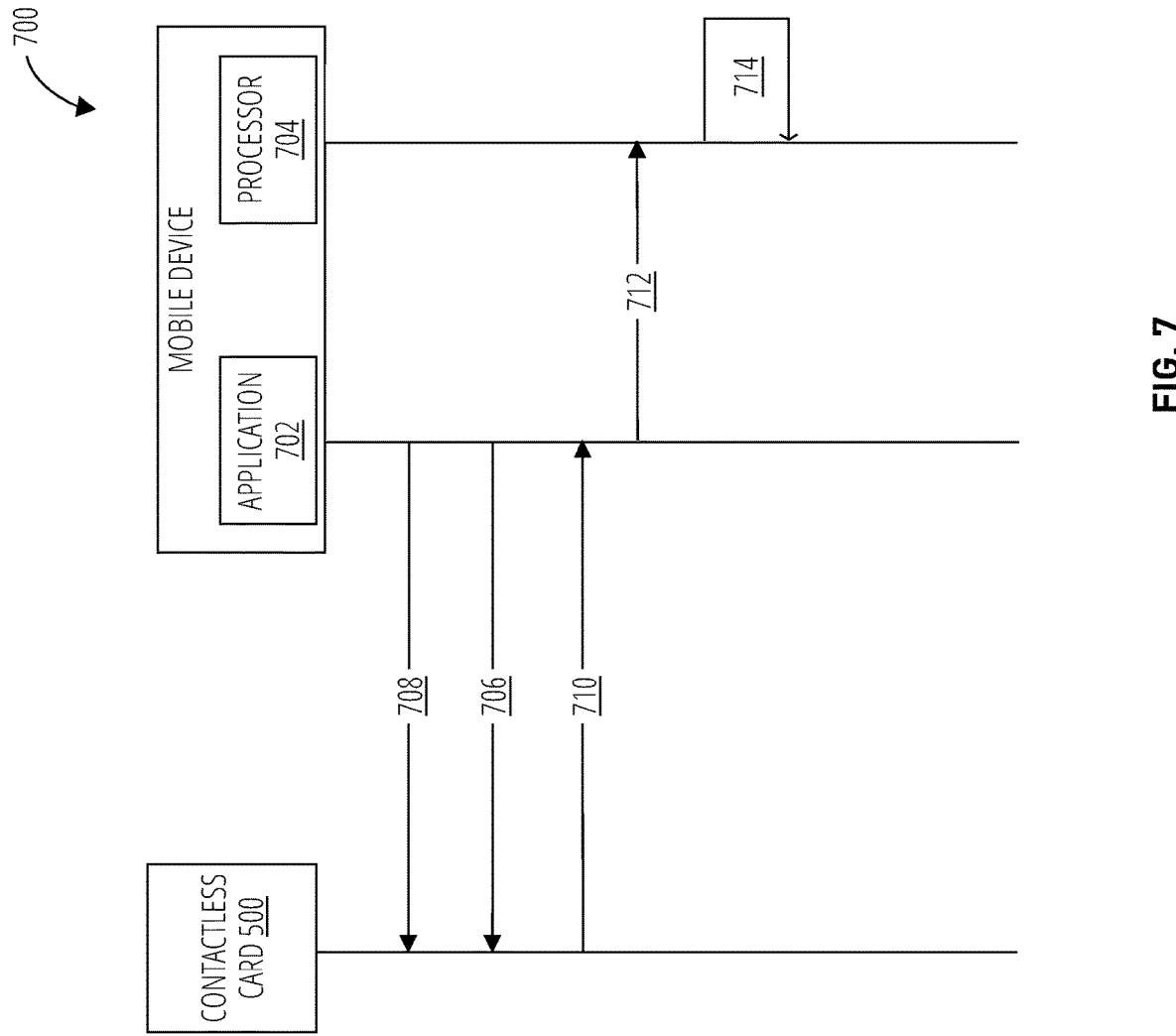
FIG. 7 illustrates a sequence flow 700 in accordance with embodiments.

FIG. 7 is a timing diagram illustrating an example sequence for providing an exchange of data according to one or more embodiments of the present disclosure. Sequence flow 700 may include contactless card 500 and a mobile device, which may include an application 702 and processor 704.

At line 708, the application 702 communicates with the contactless card 500 (e.g., after being brought near the contactless card 500). Communication between the application 702 and the contactless card 500 may involve the contactless card 500 being sufficiently close to a card reader (not shown) of the mobile device to enable NFC data transfer between the application 702 and the contactless card 500.

At line 706, after communication has been established between mobile device and contactless card 500, contactless card 500 generates a message authentication code (MAC) cryptogram. In some examples, this may occur when the contactless card 500 is read by the application 702. In particular, this may occur upon a read, such as an NFC read, of a near field data exchange (NDEF) tag, which may be created in accordance with the NFC Data Exchange Format. For example, a reader application, such as application 702, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 500 may be updated or incremented, which may be followed by "Read NDEF file." At this point, the message may be generated which may include a header and a shared secret, such as a token or string. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 702 may be configured to transmit a request to contactless card 500, the request comprising an instruction to generate a MAC cryptogram.

At line 710, the contactless card 500 sends the MAC cryptogram to the application 702. In some examples, the transmission of the MAC cryptogram occurs via NFC, however, the present disclosure is not limited thereto. In other examples, this communication may occur via Bluetooth, Wi-Fi, or other means of wireless data communication. At line 712, the application 702 communicates the MAC cryptogram to the processor 704.

At line 714, the processor 704 verifies the MAC cryptogram pursuant to an instruction from the application 122. For example, the MAC cryptogram may be verified, as explained below. In some examples, verifying the MAC cryptogram may be performed by a device other than mobile device, such as a server of a banking system in data communication with the mobile device. For example, processor 704 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

FIG. 8 illustrates a diagram of a system 800 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 802, 826 may be required for each part of the portfolio on which the one or more applets is issued. For example, the first master key 802 may comprise an Issuer Cryptogram Generation/Authentication Key (Iss-Key-Auth) and the second master key 826 may comprise an Issuer Data Encryption Key (Iss-Key-DEK). As further explained herein, two issuer master keys 802, 826 are diversified into card master keys 808, 820, which are unique for each card. In some examples, a network profile record ID (pNPR) 522 and derivation key index (pDKI) 824, as back office data, may be used to identify which Issuer Master Keys 802, 826 to use in the cryptographic processes for authentication. The system performing the authentication may be configured to retrieve values of pNPR 822 and pDKI 824 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 808 and Card-Key-Dek 820). The session keys (Aut-Session-Key 832 and DEK-Session-Key 810) may be generated by the one or more applets and derived by using the application transaction counter (pATC) 804 with one or more algorithms. To fit data into the one or more algorithms, only the 2 low order bytes of the 4-byte pATC 804 is used. In some examples, the four byte session key derivation method may comprise: F1:=PATC(lower 2 bytes) ||'F0'||'00'||PATC (four bytes) F1:=PATC(lower 2 bytes) ||'0F'||'00'||PATC (four bytes) SK:={(ALG (MK) [F1])||ALG (MK) [F2]}, where ALG may include 3DES ECB and MK may include the card unique derived master key.

As described herein, one or more MAC session keys may be derived using the lower two bytes of pATC 804 counter. At each tap of the contactless card, pATC 804 is configured to be updated, and the card master keys Card-Key-AUTH 704 and Card-Key-DEK 820 are further diversified into the session keys Aut-Session-Key 832 and DEK-Session-KEY

810. pATC 804 may be initialized to zero at personalization or applet initialization time. In some examples, the pATC counter 804 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, ... repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 832. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 832, as explained above. As explained above, the low order two bytes of the counter may be used to diversify for the one or more MAC session keys. As explained below, AUT-Session-Key 832 may be used to MAC data 806, and the resulting data or cryptogram An 814 and random number RND may be encrypted using DEK-Session-Key 810 to create cryptogram B or output 818 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 810 derived from the Card-Key-DEK 820. In this case, the ATC value for the session key derivation is the least significant byte of the counter pATC 804.

The format below represents a binary version example embodiment. Further, in some examples, the first byte may be set to ASCII 'A'.

Message Format

| 1 | 2 | 4 | 8 | 8 |
|---|---|---|---|---|
| 0x43 (Message Type 'A') | Version | pATC | RND | Cryptogram A (MAC) |
| Cryptogram A (MAC) | 8 bytes | | | |
| MAC of | | | | |
| 2 | 8 | 4 | 4 | 18 bytes input data |

19

-continued

| Version | pUID | pATC | Shared Secret | |
|---|---|---|---|---|
| Message Format | | | | |
| 1 | 2 | 4 | 16 | |
| 0x43 (Message Type 'A') | Version | pATC | Cryptogram B | |
| Cryptogram A (MAC) | 8 bytes | | | |
| MAC of | | | | |
| 2 | 8 | 4 | 4 | 18 bytes input data |
| Version | pUID | pATC | Shared Secret | |
| Cryptogram B | 16 | | | |
| Sym Encryption of | | | | |
| 8 | 8 | | | |
| RND | Cryptogram A | | | |

Another exemplary format is shown below. In this example, the tag may be encoded in hexadecimal format.

| Message Format | | | | |
|---|---|---|---|---|
| 2 | 8 | 4 | 8 | 8 |
| Version | pUID | pATC | RND | Cryptogram A (MAC) |
| 8 bytes | | | | |
| 8 | 8 | 4 | 4 | 18 bytes input data |
| pUID | pUID | pATC | Shared Secret | |
| Message Format | | | | |
| 2 | 8 | 4 | 16 | |
| Version | pUID | pATC | Cryptogram B | |
| 8 bytes | | | | |
| 8 | 8 | 4 | 4 | 18 bytes input data |
| pUID | pUID | pATC | Shared Secret | |
| Cryptogram B | 16 | | | |
| Sym Encryption of | | | | |
| 8 | 8 | | | |
| RND | Cryptogram A | | | |

The UID field of the received message may be extracted to derive, from master keys Iss-Key-AUTH 500 and Iss-Key-DEK 826, the card master keys (Card-Key-Auth 808 and Card-Key-DEK 820) for that particular card. Using the card master keys (Card-Key-Auth 704 and Card-Key-DEK 820), the counter (pATC) field of the received message may be used to derive the session keys (Aut-Session-Key 832 and DEK-Session-Key 810) for that particular card. Cryptogram B 818 may be decrypted using the DEK-Session-KEY, which yields cryptogram An 814 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram An 814, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 832. The input data 806 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise b 8 1 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 812, data 806 is processed through the MAC using Aut-Session-Key 832 to produce MAC output (cryptogram A) 814, which is encrypted.

In order to provide additional protection against brute force attacks exposing the keys on the card, it is desirable that the MAC cryptogram 814 be enciphered. In some examples, data or cryptogram An 814 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 810. In the encryption operation 816, data or cryptogram An 814 and RND are processed using DEK-Session-Key 706 to produce encrypted data, cryptogram B 818. The data 814 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

FIG. 9 illustrates a method 900 for generating a cryptogram. For example, at block 902, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 904, Issuer Master Keys may be diversified by combining them with the card's unique ID number (pUID) and the PAN sequence number (PSN) of one or more applets, for example, a payment applet.

At block 906, Card-Key-Auth and Card-Key-DEK (unique card keys) may be created by diversifying the Issuer Master Keys to generate session keys which may be used to generate a MAC cryptogram.

At block 908, the keys used to generate the cryptogram and encipher the data in the one or more applets may comprise the session keys of block 1230 based on the card unique keys (Card-Key-Auth and Card-Key-DEK). In some examples, these session keys may be generated by the one or more applets and derived by using pATC, resulting in session keys Aut-Session-Key and DEK-Session-Key.

FIG. 10 depicts an exemplary process 1000 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1002, and other data, such as data to be protected, which it may secure share with the recipient.

At block 1004, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 1006, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1008, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1010, the encrypted MAC is transmitted, from the sender to the recipient, with sufficient information to identify additional secret information (such as shared secret, master keys, etc.), for verification of the cryptogram.

At block 1012, the recipient uses the received counter value to independently derive the two derived session keys from the two master keys as explained above.

At block 1014, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1016, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1002) and a new set of session keys may be created (at block 1010). In some examples, the combined random data may be discarded.

Figure 11:
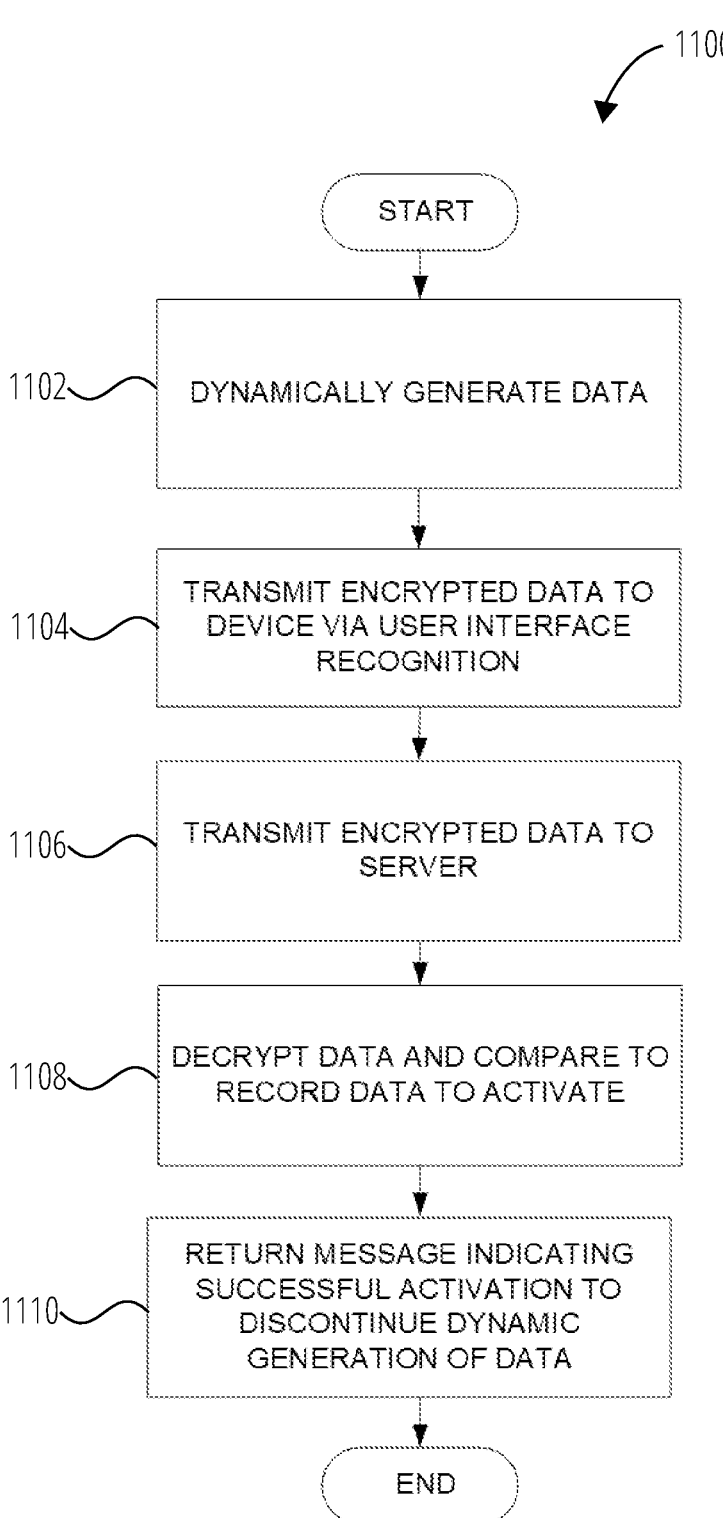
FIG. 11 illustrates an example of a 1100 in accordance with embodiments.

FIG. 11 illustrates a method 1000 for card activation according to an example embodiment. For example, card activation may be completed by a system including a card, a device, and one or more servers. The contactless card, device, and one or more servers may reference same or similar components that were previously explained a, such as contactless card 500, mobile device, and a server.

In block , the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1104, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1106, the one or more portions of the data may be communicated to one or more servers, such as a card issuer server. For example, one or more encrypted portions of the data may be transmitted from the device to the card issuer server for activation of the card.

In block 1108, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1110, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

Figure 12:
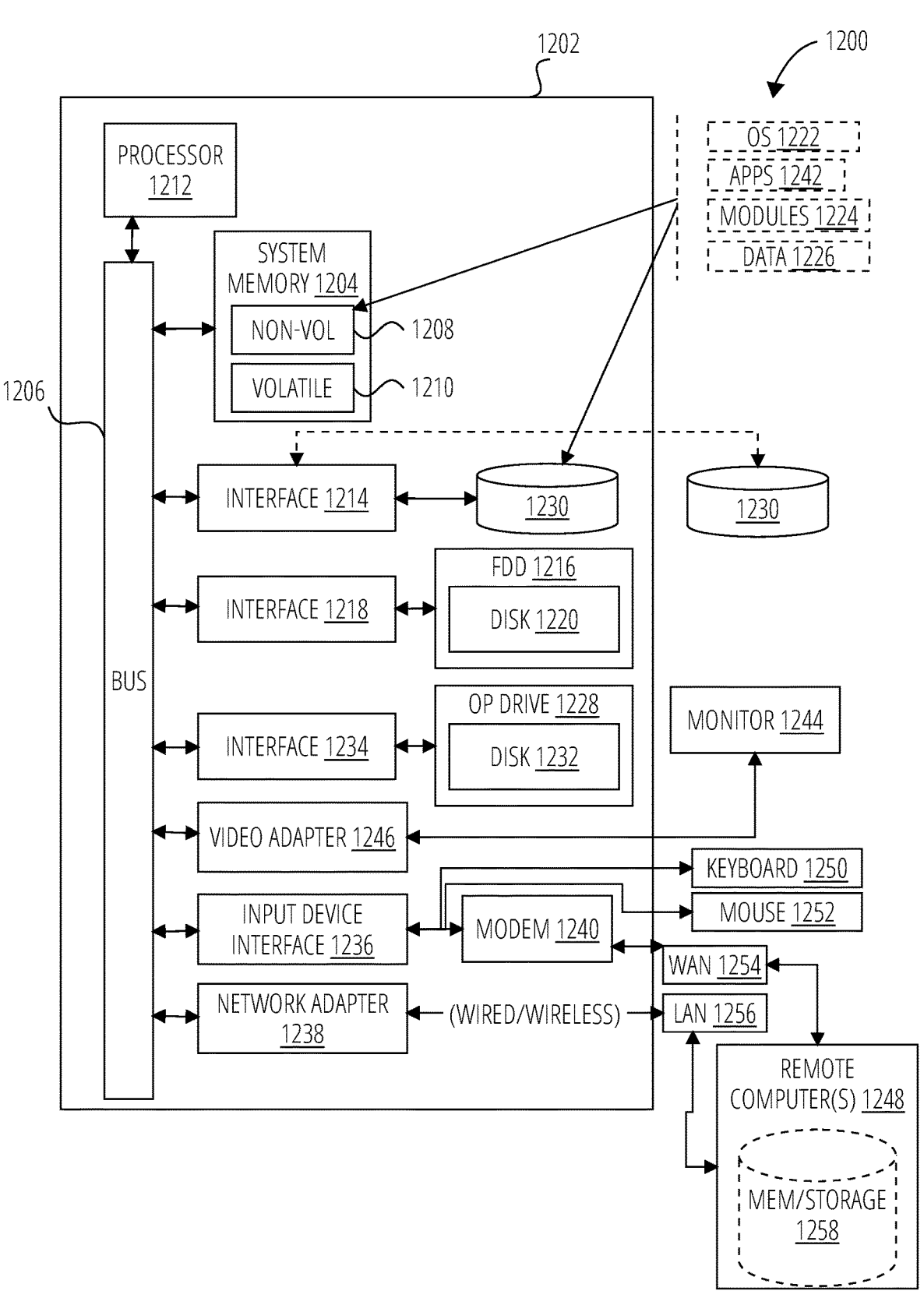
FIG. 12 illustrates a computer architecture 1200 in accordance with one embodiment.

FIG. 12 illustrates an embodiment of an exemplary computer architecture 1200 suitable for implementing various embodiments as previously described. In one embodiment, the computer architecture 1200 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing computer architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing computer architecture 1200.

As shown in FIG. 12, the computing computer architecture 1200 includes a processor 1212, a system memory 1204 and a system bus 1206. The processor 1212 can be any of various commercially available processors.

The system bus 1206 provides an interface for system components including, but not limited to, the system memory 1204 to the processor 1212. The system bus 1206 can be any of several types of bus structure that may further interconnect to a memory bus (with or without a memory controller), a peripheral bus, and a local bus using any of a variety of commercially available bus architectures. Interface adapters may connect to the system bus 1206 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 1200 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1204 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1204 can include non-volatile 1208 and/or volatile 1210. A basic input/output system (BIOS) can be stored in the non-volatile 1208.

The computer 1202 may include various types of computer-readable storage media in the form of one or more lower speed memory units, including an internal (or external) hard disk drive 1230, a magnetic disk drive 1216 to read from or write to a removable magnetic disk 1220, and an optical disk drive 1228 to read from or write to a removable optical disk 1232 (e.g., a CD-ROM or DVD). The hard disk drive 1230, magnetic disk drive 1216 and optical disk drive 1228 can be connected to system bus 1206 the by an HDD interface 1214, and FDD interface 1218 and an optical disk drive interface 1234, respectively. The HDD interface 1214 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1208, and volatile 1210, including an operating system 1222, one or more applications 1242, other program modules 1224, and program data 1226. In one embodiment, the one or more applications 1242, other program modules 1224, and program data 1226 can include, for example, the various applications and/or components of the systems discussed herein.

A user can enter commands and information into the computer 1202 through one or more wire/wireless input devices, for example, a keyboard 1250 and a pointing device, such as a mouse 1252. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1212 through an input device interface 1236 that is coupled to the system bus 1206 but can be connected by other interfaces such as a parallel port, IEEE 1394 serial port, a game port, a USB port, an IR interface, and so forth.

A monitor 1244 or other type of display device is also connected to the system bus 1206 via an interface, such as a video adapter 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all the elements described relative to the computer 1202, although, for purposes of brevity, only a memory and/or storage device 1258 is illustrated. The logical connections depicted include wire/wireless connectivity to a local area network 1256 and/or larger networks, for example, a wide area network 1254. Such LAN and WAN networking environments are commonplace in offices and companies, and facilitate enterprise-wide computer networks, such as intranets, all of which may connect to a global communications network, for example, the Internet.

When used in a local area network 1256 networking environment, the computer 1202 is connected to the local area network 1256 through a wire and/or wireless communication network interface or network adapter 1238. The network adapter 1238 can facilitate wire and/or wireless communications to the local area network 1256, which may also include a wireless access point disposed thereon for communicating with the wireless functionality of the network adapter 1238.

When used in a wide area network 1254 networking environment, the computer 1202 can include a modem 1240, or is connected to a communications server on the wide area network 1254 or has other means for establishing communications over the wide area network 1254, such as by way of the Internet. The modem 1240, which can be internal or external and a wire and/or wireless device, connects to the system bus 1206 via the input device interface 1236. In a networked environment, program modules depicted relative to the computer 1202, or portions thereof, can be stored in the remote memory and/or storage device 1258. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 13:
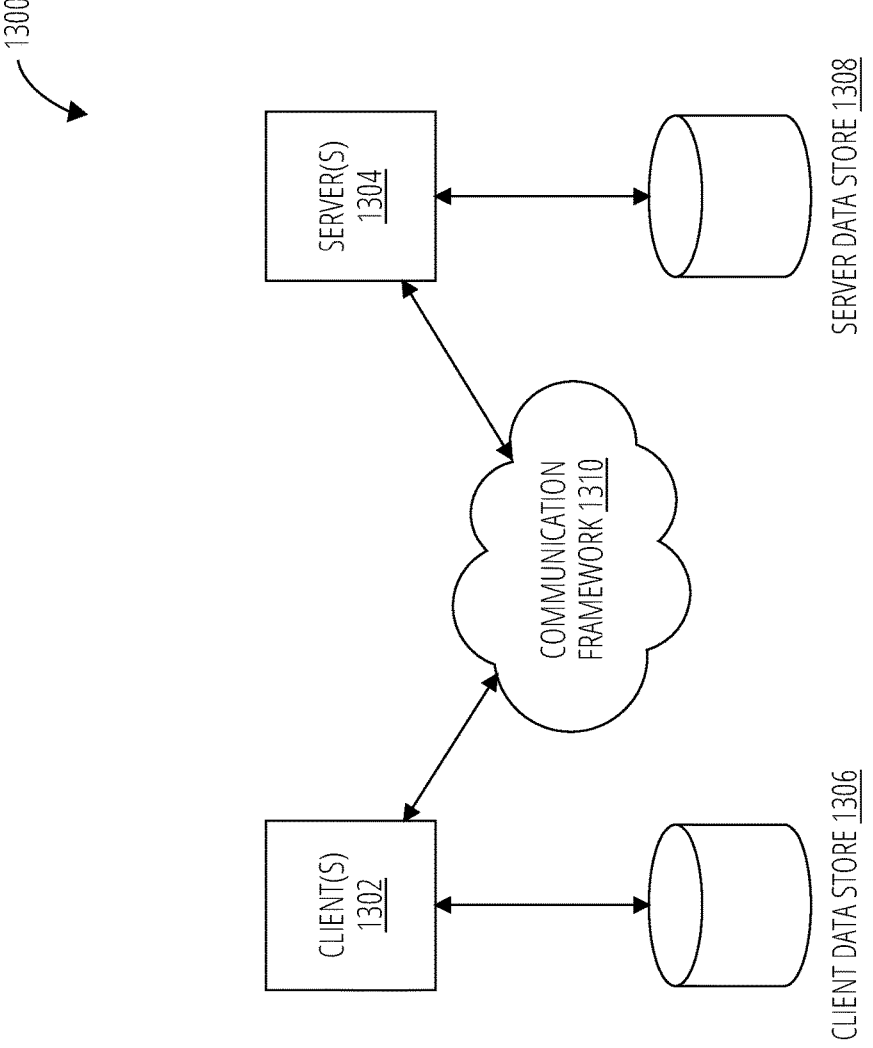
FIG. 13 illustrates a communications architecture 1300 in accordance with one embodiment.

FIG. 13 is a block diagram depicting an exemplary communications architecture 1300 suitable for implementing various embodiments as previously described. The communications architecture 1300includes various common communications elements, such as a transmitter, receiver, transceiver, radio, network interface, baseband processor, antenna, amplifiers, filters, power supplies, and so forth. The embodiments, however, are not limited to implementation by the communications architecture 1300, which may be consistent with systems and devices discussed herein.

As shown in FIG. 13, the communications architecture 1300 includes one or more client(s) 1302 and server(s) 1304. The server(s) 1304 may implement one or more functions and embodiments discussed herein. The client(s) 1302 and the server(s) 1304 are operatively connected to one or more respective client data store 1306 and server data store 1308 that can be employed to store information local to the respective client(s) 1302 and server(s) 1304, such as cookies and/or associated contextual information.

The client(s) 1302 and the server(s) 1304 may communicate information between each other using a communication framework 1310. The communication framework 1310 may implement any well-known communications techniques and protocols. The communication framework 1310 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1310 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1200 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 1302 and the server(s) 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The invention claimed is:

1. A system, comprising:
a contactless card, comprising:
  a contactless card processor; and
  a contactless card memory comprising first data, a first diversified key, a second diversified key, a counter, and instructions that, when executed by the contactless card processor, cause the contactless card processor to:
    generate a first session key using the first diversified key and the counter;
    generate a second session key using the second diversified key and the counter;
    generate a cryptogram containing the first data using the first session key and a cryptographic message authentication code (MAC) algorithm; and
    encrypt the cryptogram using the second session key and an encryption algorithm; and
a mobile device, comprising:
  a display device;
  a mobile device processor; and
  a mobile device memory comprising instructions that, when executed by the mobile device processor, cause the mobile device processor to:
    receive an input to perform an electronic exchange of information with a second mobile device;
    cause the display device to present an indication to provide the contactless card on the mobile device;
    detect, via a near-field communication (NFC) signal, the contactless card, and establish a secure two-way NFC exchange communication with the contactless card based on the contactless card coming within a communication range of the mobile device;
    receive, via the secure two-way NFC exchange communication, the cryptogram from the contactless card;
    generate a message comprising a link comprising the first data cryptogram to communicate to the second mobile device, the link configured to cause the second mobile device to perform authentication of the contactless card with the first data, the authentication performed using corresponding session keys generated by a server;
    communicate the message to the second mobile device in accordance with a text message protocol;
    establish a point-to-point (P2P) connection with the second mobile device in accordance with a P2P protocol; and
    cause the electronic exchange of information based on the authentication of the second user via the P2P connection.

2. The system of claim 1, comprising an input device coupled with the memory and the processor, the input device configured to receive the input comprising a selection of a contact, an indicated amount of money to electronically exchange, or a combination thereof as part of the electronic exchange of information.

3. The system of claim 2, wherein the link further comprises a first identifier to identify the amount of money, and a second identifier to identify the first user.

4. The system of claim 1, the processor to:
   receive the first data from the contactless card via the NFC exchange communication.

5. The system of claim 1, wherein the link when activated, is configured to launch a webpage on the second mobile device to perform the authentication of the second user with the first data.

6. The system of claim 1, wherein the first data comprises a unique identifier to identify the contactless card.

7. The system of claim 1, the processor to receive a result indicating that the contactless card is successfully authenticated.

8. The system of claim 1, wherein the text message comprises one a Short Message Service (SMS) message, a Multimedia Message Service (MMS) message, or a Rich Communication Service (RCS) message.

9. A system, comprising:
   a contactless card, comprising:
      a contactless card processor; and
      a contactless card memory comprising first data, a first diversified key, a second diversified key, a counter, and instructions that, when executed by the contactless card processor, cause the contactless card processor to:
         generate a first session key using the first diversified key and the counter;
         generate a second session key using the second diversified key and the counter;
         generate a cryptogram containing the first data using the first session key and a cryptographic message authentication code (MAC) algorithm; and
         encrypt the cryptogram using the second session key and an encryption algorithm; and
   a mobile device, comprising:
      an input device;
      a processor; and
      a memory comprising instructions that, when executed by the processor, cause the processor to:
         receive from a second mobile device, a message in accordance with a text message protocol, the message comprising a link and a first the cryptogram, the link configured to cause the mobile device to perform authentication of the contactless card associated with a first user with the first data, and establish a secure two-way communication with the second mobile device;
         detect, via the input device, an input to activate the link;
         launch an application in response to the input, wherein, in response to establishing the secure two-way communication, automatically execute authentication of the first user, wherein the application is configured to communicate with a server to perform the authentication of the first user with the first data;
         receive an indication that the first user is authenticated by the server;

establish a point-to-point (P2P) connection with the second mobile device in accordance with a P2P protocol; and
cause performance of an exchange of money based on the first data and the indication that the first user is authenticated via the P2P connection.

10. The system of claim 9, wherein the input device comprises a touchscreen interface, the touchscreen interface to detect a selection of the link on a display device.

11. The system of claim 10, wherein the link comprises a link, that when selected, launches the application.

12. The system of claim 9, comprising a display device configured to present the message in a graphical user interface (GUI) display.

13. The system of claim 9, the processor to communicate the first data to the server to perform the authentication of the first user.

14. The system of claim 13, wherein the link further comprises a first identifier of an amount of money to exchange, and a second identifier to identify the first user, and the processor to communicate at least one of the first identifier and the second identifier to the server.

15. The system of claim 14, wherein the processor to cause the performance of the exchange based the amount of money and the first user being authenticated.

16. The system of claim 9, wherein the first data comprises an encrypted string associated with the first user, and the indication comprising information to indicate that the encrypted string was successfully decrypted.

17. The system of claim 16, wherein encrypted string is a unique identifier stored on the contactless card associated with the first user.

18. The system of claim 9, wherein the text message protocol comprises one of a Short Message Service (SMS) message, a Multimedia Message Service (MMS) message, or a Rich Communication Service (RCS) message.

19. A computer-implemented method, comprising:
   a contactless card, comprising:
      a contactless card processor; and
      a contactless card memory comprising first data, a first diversified key, a second diversified key, a counter, and instructions that, when executed by the contactless card processor, cause the contactless card processor to:
         generating, by a contactless card processor of a contactless card, a first session key using the first diversified key and the counter;
         generating, by the contactless card processor, a second session key using the second diversified key and the counter;
         generating, by the contactless card processor, a cryptogram containing the first data using the first session key and a cryptographic message authentication code (MAC) algorithm;
         encrypting, by a contactless card processor, the cryptogram using the second session key and an encryption algorithm;
      detecting, by a mobile device processor of a first mobile device associated with a first user, a request to exchange money with a second user of a second mobile device;
      causing, on a display device, a prompt to request the first user associated with the first user device to tap the contactless card on the first user device;
      detecting, by the mobile device processor via a near-field communication (NFC) signal, the contactless card, and establishing a secure two-way NFC exchange communication with the contactless card based on the contactless card coming within a communication range of the first user device;

receiving, by the mobile device processor via the secure two-way NFC exchange communication, a cryptogram from the contactless card;

generating, by the mobile device processor, a text message comprising a link further comprising the cryptogram to communicate to second user device, the link configured to cause the second mobile device to perform authentication of the first user with the first data, the authentication performed using keys associated with the first user communicating the text message to the second mobile device in accordance with a text messaging protocol;

receiving, by the mobile device processor, an indication from the second mobile device indicating the first user is authenticated;

establishing, by the mobile device processor, a point-to-point connection with the second mobile device in accordance with a short-range communication protocol; and exchanging, by the mobile device processor via the short-range communication protocol, information with the second mobile device to exchange the money.

20. The computer-implemented method of claim 19, wherein the encryption algorithm is the Triple DES (3DES) algorithm.

\*   \*   \*   \*   \*